(12) United States Patent  (10) Patent No.: US 8,850,454 B2
Boullery et al.  (45) Date of Patent: Sep. 30, 2014

(54) METHOD AND COMPUTER PROGRAM PRODUCT FOR INTEGRATING A FIRST APPLICATION PROVIDING A B2B GATEWAY AND ONE OR MORE SECOND APPLICATIONS

(75) Inventors: Didier Boullery, Sartrouville (FR); Christophe Dumont, Casteau (BE)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/179,690

(22) Filed: Jul. 11, 2011

(65) Prior Publication Data

US 2012/0137304 A1  May 31, 2012

(30) Foreign Application Priority Data

Nov. 30, 2010  (EP) ..................................... 10306321

(51) Int. Cl.
*G06F 3/00*  (2006.01)
*G06F 9/44*  (2006.01)
*G06F 9/46*  (2006.01)
*G06F 13/00*  (2006.01)
*G06F 9/54*  (2006.01)

(52) U.S. Cl.
CPC ....................... *G06F 9/54* (2013.01)
USPC ....................................................... 719/313

(58) Field of Classification Search
USPC ........................................................ 719/313
See application file for complete search history.

(56) References Cited

U.S. PATENT DOCUMENTS

| 7,146,399 | B2 | 12/2006 | Fox et al. |
| 7,171,379 | B2 | 1/2007 | Menninger et al. |
| 2002/0174135 | A1 | 11/2002 | Pellegrin et al. |
| 2005/0021513 | A1* | 1/2005 | Vedula et al. ..................... 707/3 |
| 2006/0026137 | A1* | 2/2006 | Sattler et al. ...................... 707/3 |
| 2006/0112123 | A1 | 5/2006 | Clark et al. |
| 2006/0230063 | A1 | 10/2006 | Pollinger |
| 2007/0179988 | A1 | 8/2007 | Stoner et al. |
| 2008/0140554 | A1* | 6/2008 | Christy et al. .................. 705/35 |
| 2008/0234987 | A1 | 9/2008 | Haley |
| 2008/0313224 | A1 | 12/2008 | Griffith et al. |

FOREIGN PATENT DOCUMENTS

| WO | 0055767 A2 | 9/2000 |
| WO | 2008124354 A1 | 10/2008 |

OTHER PUBLICATIONS

Sebastian Bossung et al, Automated Data Mapping Specification via Schema Heuristics and User Interaction, Proceedings of the 19th International Conference on Automated Software Engineering (ASE'04), 10 pages.

* cited by examiner

*Primary Examiner* — Andy Ho
*Assistant Examiner* — Timothy A Mudrick
(74) *Attorney, Agent, or Firm* — Frederique Lopez; Hoffman Warnick LLC

(57) ABSTRACT

The invention provides for a method and computer program product for integrating an e-business service application being provided by a B2B server and one or more other remote applications by means of an Entity-Relationship model.

15 Claims, 9 Drawing Sheets

METHOD AND COMPUTER PROGRAM PRODUCT FOR INTEGRATING A FIRST APPLICATION PROVIDING A B2B GATEWAY AND ONE OR MORE SECOND APPLICATIONS

FIELD OF THE INVENTION

The present invention relates generally to the field of computer software, and more particularly to a system and method for integrating a first application and one or more second applications by using an ERM integrated to a plug-in. The disclosed techniques may also be used for integrating and/or consolidating data provided by distributed office or legacy applications and for distributed workflow automation.

RELATED ART

E-commerce transactions are performed today, e.g., in a business-to-business (B2B) context, in a business-to-consumer (B2C) context, or in a business-to-government (B2G) context. The term 'B2B' refers to transactions executed between two interacting businesses such as manufacturer and wholesaler, while the term 'B2C' refers to transactions executed between a business and, e.g., a customer. The volume of B2B transactions is much higher than the volume of B2C transactions as in a typical supply chain there will be many B2B transactions involving sub-components or raw materials but only one B2B transaction corresponding to the sale of the finished product to the end customer. For example, a bicycle manufacturer makes several B2B transactions such as buying tires, buying the saddle, and buying the headlight lamp. The final transaction (which is selling the finished bike to the consumer) is a single (B2C) transaction.

The world of e-commerce and B2B applications is changing rapidly. Some ten years ago e-commerce was mostly defined as participating in an electronic data interchange (EDI) initiative. Today, e-commerce means much more than just EDI: it means supporting interactive websites and enabling communication between multitudes of different business participants located in different regions of the world. Today, distributed business workflows are integrated by enterprise application integration systems (EAI systems). EAI has been defined as the 'integration of multiple, independently developed, managed and maintained applications that may normally use incompatible technologies and platforms'.

In the context of EAI systems, distributed and heterogeneous data and workflows of a multitude of businesses need to be seamlessly integrated. The data to be exchanged and integrated is often provided in a multitude of different proprietary or non-proprietary data formats and provided by a multitude of different applications, e.g., office applications, CRM systems and/or legacy applications.

Previously known approaches for integrating such highly heterogeneous and distributed data resources can be grouped as follows:

Some approaches to integrate highly heterogeneous and distributed data resources are based on the creation of a multitude of adaptor software modules executing data wrapping, mapping, and/or transformation procedures in order to transform data provided by one business in a first data format into another data format being interpretable by another business. These approaches are also referred to as 'adapter based' approaches.

Writing various wrapper and mapper modules is, however, expensive and requires considerable time and IT knowledge on the side of both business partners.

According to other approaches, a predefined template is provided by a first business partner, the template comprising placeholders for particular types of data values. A template is typically defined and specified by the first business partner and is distributed to one or more second business partners in order to enable the second business partner to enter their data to be integrated into the predefined template in an appropriate placeholder or in a multitude of such placeholders. The approach is, however disadvantageous as it urges the second business partner to enter data which may be stored to internal, customized databases or legacy applications a second time. In particular, small businesses which do not have an IT department and which are not able to automatically extract existing data from legacy applications and which are not able to automatically transfer the extracted data to the provided template are required to enter the existing data a second time manually. This requires a considerable amount of time or may be even impossible for large data records. One example for a template based approach is the Microsoft BizTalk™ server, an enterprise service bus which enables companies to automate business processes by means of a template. These approaches are also known as 'template based' approaches.

U.S. 2005/0021513 describes a mapping tool based on a graphical user interface used for mapping elements of a source object, e.g., a source XML schema document, to a target object, e.g., a destination document schema, by means of a graphical user interface.

U.S. 2006/0112123 describes a plug-in associated with a user's browser and an Excel application. The plug-in enables a user to transmit data, e.g., data contained in an Excel document, by establishing a web services connection over the internet. The data is submitted from one or multiple backend data system sources to a management sub-system hosted on a network server. The network server receives field data from the backend system data sources which are each related to a particular enterprise. A system administrator of the network server manually controls all aspects of how information received from the backend data system sources is extracted, stored, manipulated, correlated, and displayed at a number of internet connected clients.

U.S. Pat. No. 7,146,399 describes a server being operable to transform a schema of data ('ontology model') into another one using a common schema model in between. The transformation is executed on a server. The disclosed method requires that a source, a destination, and an intermediate ontology model are available.

SUMMARY OF THE INVENTION

The present invention provides an improved method for the integration of a first application and one or more second applications. Embodiments of the invention do not necessitate the use and/or presence of IT knowledge on the side of the one or more integrated second applications.

In one aspect, embodiments of the invention provide for an improved method for integrating heterogeneous data distributed among one or more second computer systems into a first application. The method is advantageous as an IT investment in the form of time and/or IT knowledge is not required on the side of the one or more second computer systems. It has been observed that IT investment often acts as a considerable obstacle for integrating and sharing heterogeneous data distributed among several business partners. The obstacles are particularly hindering for small companies which do not have the required IT knowledge for creating and maintaining a software infrastructure which allows the seamless integration of their generated data to the business processes of their business partners. Embodiments of the present invention make it possible also for small businesses lacking in an IT department to seamlessly and automatically integrate their data to data models and workflows of their business partners.

Embodiments of the invention allow for an automated integration of data values generated on a second computer system into the semantic data model/into the workflows of a remote e-business service application without the need for the operator of the second computer system to operate and maintain an IT infrastructure such as an application server or any other complex software system. The operator of a second computer system does not have to maintain a 24×7 e-commerce platform or to update a firewall rule.

In one further aspect, embodiments of the invention provide for an improved method for sharing entity relationship models between different business partners in a way guaranteeing that the shared entity relationship models can dynamically be updated without the requirement to redeploy any software.

In a further aspect, embodiments of the invention allow a user to map data values of an electronic document to the entity relationship model of a business partner, wherein the mapping can be flexibly adapted to updated versions of the model and/or to changes in the arrangement of data values within the electronic document. In still a further aspect, embodiments of the invention ensure that the data values to be integrated are correct and consistent with the model before they are integrated in the IT system of a business partner.

In a further aspect, embodiments of the invention provide for an automated logging system for transactional data generated or collected before or during the processing of the integrated data.

In a further aspect, embodiments of the invention reduce the amount of human interaction required for exchanging and integrating data values between two business partners.

In another aspect, embodiments of the invention allow the use of the same electronic document comprising one set of data values for different purposes such as reporting calculations to different departments of a particular business partner.

Definitions

The terms 'B2B' and 'e-business' as used herein should be considered as indicative of the main usage type of the B2B server and the e-business service application in practice, but it should not be considered as limiting to B2B servers providing services to other businesses. According to some embodiments of the invention, the client programs may also be operated by customers/consumers of a business ('B2C') or in a B2G context, for example. Technically, the term B2B server encompasses any kind of service platform, e.g., an application server or HTTP server providing services to client programs over a network. Accordingly, the term 'B2B' will in the following be used in its technical and not in its business- or usage-related meaning to determine the scope of the B2B server.

The term 'gateway' as used herein is a module, in particular a software module or application, serving as a link between two applications. A gateway as used herein enables the sharing of information between applications running on different computer systems and being connected to each other via a network. A 'gateway' may act as link between a B2B server running on a server computer system, also referred to as 'first computer system' and a second application running on a client computer system also referred to as 'second computer system'. The second application having been installed on the client computer system can, e.g., be an office or legacy application or a component of the middleware of the client IT infrastructure running on the client computer system.

A gateway as used herein may serve as interface for the B2B server comprising one or more e-business service applications and one or more client applications by supporting at least one communication protocol and/or service framework such as Web Services (SOAP, XML), email exchange, HTTP requests/responses and the like. A 'Web Services Gateway' as used herein may enable a client to trigger web service invocations and may manage a multitude of web services provided by the B2B server.

The term 'B2B gateway' as used herein refers to a gateway serving as interface between services provided by the B2B server and a client application, e.g., a plug-in running on a client computer system.

The term 'B2B server' as used herein refers to an application acting as a framework for the provision of services, e.g., e-business services, to client computer systems over a network via a B2B Gateway. A 'B2B server' may be, for example, a Web application server making use of JSPs or Servlets, an HTTP server making use of CGI or JavaScript, a message-oriented middleware, an FTP server and/or an email server. A B2B server may be used by its operator, e.g., a first company, to provide services to its business partners, e.g., one or more second companies.

The term 'server computer system' as used herein refers to a computer system hosting a B2B server. The B2B server may comprise or be operatively connected to one or more service applications, e.g., e-business service applications. An 'e-business service application' is in the following also referred to as 'first application'. The computer system hosting the e-business service application to which data of a business partner is to be integrated is in the following referred to as 'first computer system'. As will be appreciated by a person skilled in the art, a B2B gateway may make accessible a plurality of service applications to remote clients via one or more B2B gateways, wherein the service applications may be deployed on the same computer system as the B2B server and the B2B gateway or on another computer system being operatively coupled to the B2B server. For the sake of simplicity, it will in the following be assumed that the e-business service application and other service applications being of relevance in the context of the invention are deployed on the same computer system as the B2B server and the B2B gateway, i.e., the 'first computer system'. Other embodiments wherein the service applications are hosted on another server computer systems are considered as mere design choice, as anyone skilled in distributed services will easily appreciate. Accordingly, the other servers are in the following included in the expression 'first computer system'.

The term 'client computer system', also referred to as 'second computer system' encompasses a computer system having stored and/or installed a source application and a client application, e.g., a plug-in, the client application being connectable to the server computer system via a network. A client computer system will be considered herein as client computer system irrespective of whether it may act in addition as server computer system in respect to any third party client. A client computer system may be any kind of computer system, e.g., a desktop PC, a notebook or mobile phone or the like.

The term 'client application' as used herein encompasses any application being operable to call a service, e.g., a service provided by an e-business service application, via the B2B gateway of a B2B server over a network.

The term 'source application' as used herein refers to any application providing for one or more electronic documents comprising data values which are to be integrated to the remote e-business service application. Typically, but not necessarily, a source application is an office application such as MS Excel or MS Word, a module of a client side middleware software system, a CRM system, a database client application or a legacy application running on a client computer. A source application, herein also referred to as 'second application', acts as 'data source' of the data to be integrated to the remote e-business service application.

The term 'e-business service application' as used herein encompasses any service application, in particular an e-business service application, being provided by a B2B server via one or more B2B gateways to one or more remote client applications.

The expression 'integration of a first and a second application' as used herein encompasses at least the integration of data values provided by the second application into a data model of the first application, the first application being operable to process and interpret the data provided by the second application.

A 'plug-in' as used herein is a software component that adds specific capabilities to a source application (second application). Plug-ins may enable customizing the functionality of an application. The term is used herein as general term comprising also 'snap-ins', 'extensions' and 'add-ins' (plug-ins of MS Office applications).

The term 'entity relationship model (ERM)' as used herein encompasses any abstract or conceptual representation of data and/or workflows being relevant for a particular person or company. An ERM is a conceptual schema and/or semantic data model of a system or process. Typically, an ERM comprises entities, i.e., elements representing objects like persons, goods, companies and orders and relationships connecting the elements. An ERM as used herein may also comprise pure data models not comprising any relation types and only being based on the organization of data objects.

In one aspect, the invention relates to a computer implemented method for the integration of a first and one or more second applications, the first application being an e-business service application and being provided by a B2B server. The B2B server is accessible via one or more B2B gateways. The first application is running on the first computer system and each of the one or more second applications is running on one of one or more second computer systems. The method comprises: integrating an Entity-Relationship model of the first application in a plug-in of one of the one or more second applications; displaying graphical user interface components representing elements of the integrated Entity-Relationship model to the user of the second application by the plug-in, wherein the graphical user interface components enable a user to specify a mapping of one or more placeholders of an electronic document of the second application to one or more elements of the Entity-Relationship model, wherein each placeholder is a container for one or more data values, and enable a user to flexibly adapt the specified mapping to an updated version of the Entity-Relationship model or to changes in the arrangement of data values within the electronic document; submitting a message by the plug-in to the B2B server via one of the one or more B2B Gateways, the message comprising the one or more mapped data values and information to which element of the Entity-Relationship model the one or more data values were mapped to.

According to embodiments, the operator of the first application creates and specifies an ER model which is descriptive of at least some aspects of the structure and organization of data processed by that first application. The operator of the first application who is typically also the operator of the B2B server creates the plug-in which may be provided to its business partners operating the second computer systems.

The one or more data values of the document to be integrated into the first application may have been entered by a user into an electronic document before or after the source application was started and before or after the electronic document was loaded by the source application. The data values of the electronic document may have been extracted from a database and imported into the electronic document automatically or manually. The data values of the electronic document may also have been retrieved by program routines of the source application. For example, the source application may be a CRM system being operable to execute database queries using MS Query or MS Access to populate an electronic document with data values derived from a database.

According to embodiments the B2B server is, for example, an application server or an HTTP server being accessible by the plug-in via one or more secure B2B gateways. A secure B2B gateway may be based, e.g., on the HTTPS protocol or on various encryption techniques guaranteeing the privacy of data exchanged between the plug-in and the e-business service application or between the plug-in and the B2B server. A secure B2B gateway may also be, for example, an email gateway using encryption techniques.

According to embodiments the ERM is a business model of the e-business service program having been specified by the operator of the first computer system.

The ERM may comprise, for example, entities and relation types specifying a business workflow, i.e., how data such as sales orders, billing information, product information, or the like is organized and processed. According to some embodiments, the ERM may model and specify technical workflows and/or data structures of a business partner, e.g., a manufacturer. Depending on the embodiment, the e-business service application may be operable to process one or more ERMs, for example, a first ERM comprising an ontology of customers, partner businesses, and internal and external suppliers. A second ERM of the e-business service application may comprise entities and relations defining a workflow being triggered by the receipt of an order, the workflow and the ERM model comprising relations such as 'ordered good', 'is located in', 'warehouse', 'is managed by', or 'warehouse manager'. Different ERMs may be used by the business service application to manage different workflows, wherein the same entity, e.g., 'business partner' may be an element of one or more different ERMs of the e-business service application.

According to embodiments, the ERM is integrated into the plug-in in a first step and transferring the plug-in comprising the integrated ERM from the first computer system to the second computer system in a second step, the second computer system having installed and/or stored a second application (source application). The second application and the e-business service application running on the first computer system are to be integrated using the ERM model of the plug-in. The integration is executed on the first computer system or any other system being operated by the operator of the first computer system.

The plug-in may be created by the operator of the e-business service application, e.g., by the IT department of a big company acting as supplier and having a business relationship to a multitude of smaller companies acting as customers who have their goods delivered to their clients by the help of the supplier. The IT department of the supplier may specify one or more ERMs, each ERM comprising data objects and may also comprise relation types for modeling workflows of the supplier. The supplier may integrate one or more of the ERMs into a plug-in, e.g., an Excel plug-in, and provide the plug-in comprising the one or more ERMs to its contracted or registered business partners (the customers). For example, the supplier may send the plug-in comprising one or more of the supplier's ERMs to its customers via CD-ROM or email or the supplier may offer the plug-in including the integrated ERMs for download via the supplier's website. After a customer has received the plug-in, he may install and/or execute it on his local computer system, here referred to as second computer system, having installed a second application the plug-in is interoperable with, e.g., MS Excel. This embodiment is advantageous as no additional step is needed in order to integrate the one or more ERMs into the plug-in running on the second computer system.

According to other embodiments, the plug-in is provided to the second computer systems before the entity relationship model (ERM) is integrated. Accordingly, integrating the one or more ERMs of the first application is executed on the second computer system by the plug-in.

Depending on the embodiment, the one or more ERMs of the e-business service application may be retrieved manually by the user of the second computer system (e.g., the customer). The user of the second computer system may download the ERMs, for example, from the supplier's website or receive the one or more ERMs via email or any other media. According to other embodiments, the ER model is received by the plug-in running on a second computer system from the first application via a network automatically, e.g., by submitting a Web Service Request. After having received the requested ERM, the plug-in integrated the received ERM automatically.

According to still further embodiments, the plug-in may retrieve one out of a plurality of different ERMs for integration from the first application depending on the selection of and/or the approval to by a user.

According to some of the above embodiments, the one or more ERMs are retrieved by the plug-in from the e-business service application via the B2B gateway of the B2B server. The B2B gateway may also be used to update the ERMs and rules already integrated to the plug-in having already been installed and/or deployed to the second computer system.

Depending on the implementation of the plug-in and the second application, an installation step on the second computer system may be required to make the plug-in interoperable with the second application.

According to embodiments, to provide for a flexible client-side mapping, the mapping is entered by a user by assigning graphical user interface (GUI) components representing the elements to placeholders of the electronic document. Each placeholder is a container for one or more data values which may or may not contain a data value at the moment of the mapping. The GUI components are provided by the plug-in and are indicative of the element of the ERM represented by the component. According to embodiments, the indication does not comprise displaying the ERM element as it is technically specified, e.g., as XML schema element. Rather, the indication comprises indicating the identity and function of the represented ERM element in a comprehensible way that can be understood also by a non-IT expert user.

According to some embodiments, the mapping is specified by a user by assigning the graphical user interface components to the one or more placeholders. Such GUI components can be, for example, selectable elements of drop-down lists, buttons, selectable images or shapes. The GUI components are presented to a user via a display such as a computer screen or mobile phone screen. According to embodiments, each GUI component is indicative of an element of the ERM model it represents in an easily comprehensible way which does not require any IT knowledge of the user to understand the meaning of each represented model element.

When a user starts the plug-in for executing a mapping, the plug-in reads its integrated ERM and creates, for each ERM element, a GUI component which is displayed to the user for selection. In case the plug-in or the electronic document already comprises a mapping, and in case the mapping is loaded, the placeholders of the electronic document having already been mapped to an ERM element are also displayed to the user.

For example, a GUI component may comprise a human-readable text string explaining the type and function of a particular model element such as 'customer ID'. According to other embodiments, the text string may be displayed or highlighted in another GUI component, e.g., a pane or a dialogue window upon selection of an ERM element by a user. A GUI component may be a purely graphical element such as a square, a symbol, an image or any combination of a graphical element and a text string. The other GUI components may in addition indicate whether assigning a data value to a particular ERM element is mandatory or not, and how many placeholders can be mapped/assigned.

According to embodiments of the invention, the plug-in is operable to automatically recognize cut-and-paste user actions executed on placeholders of an electronic document and to automatically update any mapping having been stored in the electronic document or in the plug-in automatically. For example, a user may open an MS Excel document comprising a multitude of data values and comprising also a mapping between some spreadsheet cells comprising data values and some ERM elements. In case the user decides to rearrange data in the spreadsheet which has already been mapped to an ERM element, e.g., by selecting data contained in a first column, cutting it to the clipboard, and pasting the clipboard content into another column, the plug-in is operable to automatically determine the new location of the already mapped data values and to adapt the stored mapping accordingly. The flexibility provided by the feature by far exceeds the possibilities provided by template based solutions wherein a rearrangement of data usually renders the affected document template unusable by the business partner.

Embodiments of the invention support the adaptation of existing mappings between placeholders of data values in electronic documents to new versions of an ERM of a business partner. The plug-in running on the second computer system submits a model update request to the first application e.g., on a regular basis or upon every start of the plug-in and/or second application. The plug-in receives a model update response comprising an updated (newer) version of the one or more ERMs having been already integrated into the plug-in or comprising a notification that no newer ERM version is available. Upon receipt of the updated ERM version from the first application via the B2B gateway by the plug-in, the outdated ERM of the plug-in is replaced by the received new ERM version. Upon calling the plug-in, a user may adapt existing mappings and assign document placeholders to ERM elements of the updated ERM version by means of the GUI components provided by the plug-in.

After existing or new data values have been mapped to the new version of the ERM by the plug-in, a message comprising the ERM instance may be created by the plug-in and be submitted to the first application. The message may comprise one or data values having been mapped to elements of an instance of the updated ERM version.

The steps to be executed on the side of the first computer system in order to provide the updated ERM version are described in greater detail in the 'server side' chapter.

According to some embodiments, the method further comprises: receiving the message by a receiver instance, the receiver instance being the B2B server or the first application, and storing the received message to a data storage by the receiver instance; executing one or more program routines using data of the received message as input, thereby gathering or generating transactional data (in an embodiment, the program routines are executed by the receiver instance); storing the transactional data in association with the message (in an embodiment, the transactional data is stored by the receiver instance in a data repository operatively coupled to the first computer system); receiving a request for the transactional data, the request being submitted by the plug-in and being received by the receiver instance; sending, in response to the receipt of the request, the requested transactional data from the receiver instance to the plug-in; and upon receipt of the requested transactional data by the plug-in, automatically updating the electronic document by the plug-in.

Transactional data can be any kind of data having been generated by the receiver instance before or in response to the receipt of the message or in response to the receipt of a request for transactional data. The term 'transactional data' is not restricted to data related to a transaction in its strict technical meaning, but rather comprises any data being determined by the first application to be of relevance in the context of integrating data provided by a second application, in particular data having been created by the first application in response to having received the message or the transactional data request.

For example, in case a message having been sent by the plug-in to the first application comprises a list of identifiers of goods that need to be delivered by the operator of the first application (e.g., a supplier), the first application may evaluate, whether the goods contained in the list have to be gathered from different warehouses or from one single warehouse. The calculated transactional data is indicative of the current location of the ordered goods and may be stored in association with the received message on the server side.

Transactional data may also be preprocessed data determined upon analysis of the received request for transactional data. For example, transactional data may comprise advertisement data having been determined to be potentially of interest to the operator of the second computer system or simply having been determined not yet to have been sent to the operator previously.

The transactional data may have been generated by the e-business service application or by another back end service application of the B2B server. The transactional data may have been created by default, e.g., comprising general product- or company-related information, or may have been generated in response to and/or as a result of the received message.

As anyone familiar with B2B servers, in particular application servers, will easy appreciate, the question whether transactional data is generated by the first application, by any other application hosted by the B2B server, or by a software module being an integral part of the B2B server, is a mere design choice. Accordingly, transactional data may be generated by any of the applications.

According to embodiments, neither the B2B server nor the first application initiates the transmission of transactional data to the plug-in. The B2B server generates or gathers, upon receipt of a request for transactional data by the plug-in, transactional data and returns the transactional data in the form of an asynchronous response to the plug-in. The response may for example comprise an ERM instance comprising data values added by the first application or a notification on the availability of the ERM instance comprising server-side data values. Likewise, the first application only pushes a new ERM version to the plug-in upon having received an update request from the plug-in.

According to embodiments, transactional data is generated by the e-business service application, another service application accessible via the B2B server, or the B2B server itself. The generated transactional data is stored on the server side, i.e., to a data storage medium being operatively coupled to first computer system.

When the first computer system receives a request for transactional data from the plug-in, the first computer system submits the requested transactional data alone or together with a previously received message corresponding to the transactional data to the plug-in.

According to embodiments, the plug-in receives the requested transactional data and stores it to a data storage medium being operatively coupled to the second computer system. According to some embodiments, the transactional data is stored in association with a message having been received by the first computer system and having been used for calculating the transactional data.

According to some of the above embodiments, the plug-in stores the requested and received transactional data into a storage medium being operatively coupled to the second computer system, e.g., into a electronic document or into a plug-in-internal data repository. The data storage may be an MS Access database having been installed on the second computer system.

According to embodiments, relational databases running on the second computer system are used for storing the transactional data. For example, Microsoft Excel is delivered and installed together with an internal Microsoft Access database which is usually not directly accessible by the user of the second computer system. The Access database can be used by an Excel- or MS Word plug-in to store transactional data on the client side.

According to further embodiments, the message as submitted by the plug-in to the B2B server is stored in addition in association with the above mentioned received transactional data into the data storage being operatively coupled to the second computer system. The expression 'stored in association' refers to storing a first piece of data together with a second piece of data in a way that the first and the second piece of data can be retrieved at a later moment of time together.

According to still further embodiments, the first computer system as well as the second computer system stores the message and corresponding requested transactional data redundantly in multiple copies. The multiple copies are stored in different data formats. A first data format corresponds to the format used for exchanging the message and corresponding transactional data between the receiver instance and the second application. At least one copy of the message and corresponding transactional data is stored in another data format, the other data format being particularly suited for the needs of the plug-in (second computer system side) or the receiver instance (first computer system) respectively.

The above embodiments of the computer-implemented method comprise steps being executed on the first computer system as well as steps being executed by a plug-in running on a second computer system. In the following, the steps to be executed on the server- and on the client side will be described in greater detail separately.

As has been explained previously, the operator of the first application specifies one or more ERMs to be integrated into a plug-in before or after the plug-in is transferred to a second computer system. In case the processes and workflows executed by the first application and the corresponding ERM change, the operator of the first application has to specify a new, updated version of the ERM and needs to ensure that his business partners are provided with the new (or 'updated') ERM version. A further problem to be solved is that the data generated by the source applications of his business partners need to be re-mapped to the new ERM version.

In a further aspect, the invention relates to a computer-implemented method executed on a first computer system for the integration of a first and one or more second applications, the first application being an e-business service application and being provided by a B2B server, the B2B server being accessible via one or more B2B gateways. The first application runs on the first computer system and each of the one or more second application runs on one or more second computer systems. The method comprises the following to be executed by the first application: providing an ERM for integration into a plug-in of one of the one or more second applications, the plug-in to be installed or being already installed on one of the one or more second computer systems; receiving a model update request from the plug-in running on the second computer system; submitting an updated ERM version to the plug-in in response to the receipt of the model update request, the plug-in having been installed on the second computer system; and receiving a message comprising an ERM instance from the plug-in, the received Entity-Relationship model instance comprising or more data values having been mapped to elements of the updated Entity-Relationship model version.

According to further embodiments of the invention, the method further comprises the step of: storing the received message by a receiver instance, the receiver instance being the first application or being the B2B server, to a data storage being operatively coupled to the first computer system; storing transactional data in association with the message, whereby transactional data is one of data having been generated by the receiver instance in response to the receipt of the message, or data having been generated previously by the receiver instance and having been identified as requested data by analyzing the received message; receiving a request submitted by the plug-in for the transactional data, the request being received by the first application; and sending, in response to the receipt of the request, the requested transactional data to the plug-in.

Depending on the embodiments, the message may comprise an identifier of the message, of the plug-in, of the user of the plug-in or of the second application in order to allow the first application to identify the sender of the message and to assign sender- or message specific transactional data to the message.

According to embodiments, transactional data is created or gathered and stored on the first computer system as described previously.

According to embodiments, the message, the model update request, and/or the request for transactional data is received from the plug-in by the first computer system via a secure data connection based on a secure communication protocol such as HTTPS. According to embodiments the message is received by the first application via the B2B gateway of the B2B server. For example, the message may be an email submitted to a B2B server via an email B2B gateway.

Depending on the embodiment, the ERM as used and processed by the first application may be specified in a particular model format. Typical ERM formats are, for example, RosettaNet, ARIBA, CXML, or various other proprietary or non-proprietary formats such as XML schema documents, RDF or OWL. Not every model format, however, may be interoperable with a second application providing the data to be integrated.

In addition, the B2B Server may be accessible via a plurality of different B2B gateways which each require a particular message format. The second computer system may, however, not comprise appropriate interfaces for each of the B2B gateways. In order to ensure that the exchange of data between the first and the one or more second computer systems can be accomplished, the operators of the first and the second computer systems have to agree on a model format and/or message format. The model- and/or message format is, according to embodiments, specified by the operator of the first computer system in the configuration data of the plug-in before or after the plug-in is transferred to the second computer system.

According to further embodiments, the method further comprises the step of providing a model format specification for integration into the plug-in, the model format specification being indicative of an ERM format, the ERM format being interpretable by the first application. The model format specification is provided by the B2B server or by the first application, e.g., by providing a downloadable model format specification source and/or by providing a plug-in which comprises the model format specification in its configuration data. By using a plug-in comprising the format specification in its configuration data for data integration, the plug-in can submit messages comprising ERM instances conforming to the specified model format and the first application will receive ERM instances which are already formatted according to the model format specification at the moment the message is received.

According to further embodiments, the method further comprises the step of providing a message format specification by the first application or the B2B server for integration into the plug-in, the message format specification being indicative of a message format, the message format being interpretable by at least one B2B Gateway of the B2B server. The message format specification is provided by the B2B server or by the first application, e.g., by providing a downloadable model format specification source. The message format may also be provided by integrating the message format into the newly created plug-in before the plug-in is transferred to the one or more second computer systems. The message received by the first application is already formatted according to the message format specification having been integrated into the plug-in at the moment the message is received.

According to embodiments, the 'model format specification' and the 'method format specification' are implemented as elements of configuration data of the plug-in respectively, whereby the configuration data may be implemented, e.g., as a configuration file of the plug-in. For example, the first and the second business partner operating the first and the second application, respectively, may agree on a particular model format of the exchanged ERM instances and may agree on a message format of the message submitted from the plug-in to the first application. The operator of the first application who is also in charge of implementing the plug-in may specify the ERM model format and the message format in the configuration file of the plug-in according to the agreement. When the plug-in including the plug-in configuration file is transferred to the second computer system, the plug-in will transform mapped data values into an ERM instance according to the model format having been agreed upon and having been specified in the model format specification.

In a further aspect, the invention relates to a computer readable storage medium having a computer program product stored thereon, which when executed by a processor, automatically operates the steps of the any one of the previously mentioned embodiments of the method executed on the first computer system.

In a further aspect, the invention relates to a server computer system for the integration of a first and one or more second applications, the server computer comprising at least one processor and at least one computer-readable storage medium comprising instructions specifying at least a B2B server and an e-business service application, wherein the at least one processor, when executing the instructions, operates the steps of any of the previously mentioned embodiments of the method to be executed by the B2B server or the first application on the first computer system.

In a further aspect, the invention relates to a computer implemented method for the integration of a first and a second application, the first application being an e-business service application and being provided by a B2B server, the B2B server being accessible via one or more B2B gateways, the first application running on a first computer system, the second application running on one of one or more second computer systems, the method comprising: displaying, using a plug-in, graphical user interface components representing elements of an Entity-Relationship model to a user of the second application, the Entity-Relationship model being an Entity-Relationship model of the first application, the plug-in being interoperable with the second application, wherein the graphical user interface components enable a user to specify a mapping of one or more placeholders of an electronic document of the second application to one or more elements of the Entity-Relationship model, wherein each placeholder is a container for one or more data values, and enable a user to flexibly adapt the specified mapping to an updated version of the Entity-Relationship model or to changes of the arrangement of data values within the electronic document; submitting a message by the plug-in to the B2B server via one of the one or more B2B Gateways, the message comprising the one or more mapped data values and information to which element of the Entity-Relationship model the one or more data values were mapped to.

According to further embodiments, n messages are created by the plug-in, n being an integer larger than 0. According to the embodiments, the method further comprises: storing, for each n, a mapping by the plug-in, each mapping specifying one or more placeholders of the electronic document and elements of the Entity-Relationship model to which the placeholders were mapped, wherein each placeholder is a container for one or more data values; for each of the n stored mappings, automatically executing a parsing step, each parsing step specifying a message by determining one or more placeholders and data values contained therein having been mapped to one or more elements of the Entity-Relationship model according to the stored mapping, the parsing being executed by the plug-in; and submitting, for each of the n stored mappings, a message from the plug-in to the first computer system, each message comprising the at least one mapped data value and information to which element of the Entity-Relationship model the data value was mapped to according to the stored mapping.

According to embodiments of the invention, the plug-in is operable to execute checks during and/or after the mapping and the creation of a new ERM instance, the checks comprising at least one of 'data type correctness checks', 'data consistency checks' and 'remote checks'.

A 'data type correctness check' comprises determining, by the plug-in, the data type a particular element of the ERM is supposed to have, for example, 'string' or 'integer'. In case a data value of a first type, e.g., 'string' is assigned to an ERM element requiring another type, e.g., an integer, an error message is displayed and/or the assignment and mapping is prohibited.

A 'data consistency check' comprises determining, by the plug-in, whether an assigned data value would lead to inconsistencies or other problems in the ERM model logic. For example, a check for data consistency may determine whether a data value was mapped to an ERM element which requires a data value assignment. In case no data value was assigned to such an element, the creation of an ERM instance is prohibited. According to another example, in case a price is assigned to an ERM element representing an 'order', the 'order' comprising multiple goods and the price of the 'order' being lower than the price of one of the ordered goods and no discount being given for the 'order' item, the execution of a consistency check guarantees that such assignments are prohibited. A program logic of the plug-in, e.g., a rule, may prescribe that the total price of an order may not be lower than the price of any of the ordered goods if no discount is given.

According to embodiments, the 'data consistency check' is implemented by a set of rules being stored in the plug-in and being executed by the plug-in during the check. According to embodiments, the plug-in is operable to execute: submitting a rule update request to the first application via the B2B server; receiving one or more rules having been submitted to the plug-in by the B2B server in response to the receipt of the rule update request; receiving one or more updated rule versions from the first application; and replacing outdated rules of the plug-in by the received updated rule versions. According to embodiments, one or more rules are operable to change data values being contained in a placeholder having been mapped to an ERM element during the creation of the ERM instance. For example, the rule may transform a weight specified in pounds into another unit, e.g., kg. Another rule may read the number of ordered goods and the price of each good from the electronic document, calculate the sum and store the calculated sum in the created ERM instance in a 'total price' ERM element.

A 'remote check' is a program routine of the plug-in calling a checking service application hosted on the B2B server and being accessible via a B2B gateway of the B2B server, e.g., a Web Services Gateway. The checking service application receives data values which were assigned to the ERM model integrated in the plug-in during the mapping step. The data values are submitted by the plug-in to the checking service application via the B2B gateway during the generation of a new ERM instance. The checking functionalities provided by the checking service application comprise a 'data completion functionality' and/or a 'data checking functionality'.

If the e-business service application has access to additional data which need to be mapped to one or more ERM elements during the mapping process, but which is not available on the side of the second computer system, the plug-in may call the remote check functionality of the plug-in. As a result, the plug-in calls the checking service application. The called checking service application retrieves the additional data, e.g., from other service applications or server side data repositories. The retrieved data is then returned to the plug-in and mapped by the plug-in to ERM elements.

For example, in case the plug-in needs to know the ID used by the remote e-business service application to identify a third party business for specifying a ERM instance, the plug-in may submit a request to the checking service application via the B2B Gateway, the request comprising some data on the third party business. The called checking service application receives the request from the plug-in, reads the requested ID from a data storage, and returns it to the plug-in. The plug-in then receives the ID used by the e-business service application to identify the third party business and maps the ID to an ERM element during the mapping.

Alternatively, or in addition, the plug-in may use the 'data checking' functionality of the checking service application. The checking service application comprises several program routines evaluating one or more data values having been mapped and submitted to the checking service application of the first computer system. The routines evaluate several features of the submitted data values and return a result value, e.g., a binary yes/no result value, to the plug-in. For example, the number of digits of a numerical value having been mapped by the plug-in to an ERM element may be submitted to the checking service application, which examines whether the mapped numerical value conforms to some formal requirements such as minimum length, maximum length and the like.

Depending on the embodiment, the checking service application may likewise be a component or program module of the first application. The checking service application increases the quality of data integration and helps to manage and distribute shared data by maintaining the data at a central repository, thereby reducing time and effort required for data updates. In addition, it allows executing data checks which can easily be updated without the need to update any of the plug-ins installed at the second computer systems.

According to further embodiments, the plug-in is operable to transform the ERM instance into one or more different model formats and to execute: reading one predefined model format identifier by the plug-in from plug-in configuration data; providing the read model format identifier to a mapping engine of the plug-in, the mapping engine being operable to transform the Entity-Relationship model instance into one or more different model formats; and transforming the Entity-Relationship model instance into a model format identified by the provided model format identifier, the model format being interpretable by the first application. The model instance may be integrated in a message and submitted as part of the message by the plug-in to the first application via the B2B gateway.

According to further embodiments, the plug-in is operable to transform the message into one or more different message formats, the plug-in being operable to execute: reading one predefined message format identifier by the plug-in from plug-in configuration data; providing the read message format identifier to a wrapper module of the plug-in, the wrapper module being operable to transform the message into one or more different message formats; and transforming the message into the message format identified by the provided message format identifier, the message format being interpretable by at least one of the one or more B2B gateways. A message format may be, for example, an XML document submitted to a Web Service Gateway, an e-mail format or the like.

The plug-in may automatically or upon receiving a submit action by the user submit the new ERM instance to the first application via the B2B gateway, wherein the ERM instance conforms to the model format specified in the configuration data of the plug-in and wherein the message format conforms to the message format specified in the configuration data.

According to further embodiments of the invention, the message submitted by the plug-in to the first application comprises an identifier allowing to submit a request for transactional data having been stored in association with the message at a later moment of time.

As has been explained previously, the message received by the first application and transactional data generated by the first application or another service application of the first computer system may be stored in one or more copies on the first computer system.

An objective of executing a mapping may be the provision of a dashboard to the operator of the e-business service application, wherein the dashboard is a particular selection of data values generated by the source application on the client side.

According to embodiments, each of the one or more mappings is stored as part of the plug-in or as part of the electronic document providing the mapped data values. The implementation of 'storing the mapping as part of the electronic document' depends on the second application used. According to embodiments, the MS Access database being provided together with the MS Excel program is considered as being part of that Excel-source application and being used for storing the mapping.

When the mapping is stored into the electronic document, the user may create one electronic document comprising one or more mappings for different purposes such as creating and sending messages comprising different sets of data values or comprising identical or overlapping sets of data values being mapped to different ERM elements. Alternatively or in addition, the user may create multiple different electronic documents, each electronic document comprising only one mapping corresponding to only one single purpose, e.g., the purpose of integrating one particular set of data values contained in the electronic document into the remote e-business service application.

According to some embodiments, the mapping stored by the plug-in on a data storage being operatively coupled to the second computer system is only queried in case the remote (server-side) data storage comprising the transactional data is not available. The embodiments are advantageous, as they allow to automatically receive and maintain an up to date local copy of the transactional data generated on the server side which is available even in case a network connection does not exist.

According to embodiments, the ability to store the mapping in the plug-in is restricted to users of a particular user profile, in particular super users. This is advantageous, as a multitude of different users in a company may use the plug-in during the mapping of data values slightly differently and as a result, the data integration as specified by different uses of the plug-in may be inconsistent. To avoid this situation, a super user may specify a mapping and store the mapping within various copies of the plug-in which is distributed among a multitude of end-users. An end-user is not allowed to store his mapping in the second but is rather encouraged to use the mapping as specified by the super user. In case customizing a mapping to the needs of an end-user should be necessary (which may be the case when the end-user tries out the plug-in the first time and specifies some test mappings), the end-user can store his customized mapping in the electronic document, thereby avoiding overwriting the mapping specified by the super user.

According to still further embodiments, the plug-in at first determines whether an electronic document comprises one or more stored mappings. In case the electronic document comprises at least one stored mapping, the mapping is used for mapping placeholders and data values contained therein to elements of the ERM integrated to the plug-in. The mapping may then be used to create an ERM instance being filled with mapped data values of the electronic document. The plug-in then creates a message comprising the created ERM instance and submits the message to the B2B gateway of the B2B server hosting the e-business service application. In case the plug-in determines that no mapping is stored to an electronic document currently processed by the source program, the plug-in may use a mapping having been stored within the plug-in in order to map placeholders and data values contained therein to elements of the ERM and to create a new ERM instance.

According to further embodiments, the user, e.g., the super user, is provided with means to specify whether the mapping is to be stored within an electronic document or within the plug-in. These embodiments are advantageous as they allow a user to define one or more 'default mappings' and to store them within the plug-in for re-usage. The mapping may be loaded when opening an electronic document and may be adapted according to the particular requirements of a particular business operation. The adapted mapping may then be stored within the electronic document.

According to further embodiments of the invention, the submission of a message from the plug-in to the e-business service application via the B2B gateway is invoked by a user opening an electronic document of the source application and by calling a 'submit' function of the plug-in. For example, the user may press a 'submit' button being provided by the plug-in and being displayed in a menu of the source application. According to other embodiments, the submit function may be executed automatically, e.g., by a scheduled job. According to embodiments, one or more messages are submitted to the B2B gateway for each submit action executed by the plug-in. As a consequence of the invocation, the plug-in parses the electronic document and thereby assigns, for each mapping stored in the electronic document or in the plug-in, data values contained in the mapped placeholders to ERM elements according to each particular mapping. For each of the mappings, an ERM instance is created which is submitted in the form of a message to the e-business service application via the B2B gateway provided by the B2B server.

Immediately after having submitted the message or at any moment later in time, the plug-in may submit a request for transactional data to the first computer system. According to further embodiments, the plug-in executes: submitting a request for transactional data stored in association with the message, the request being submitted by the plug-in to the first application or the B2B server; receiving the requested transactional data by the plug-in from the first application; and upon receipt of the requested transactional data by the plug-in, automatically updating the electronic document and/or any other components such as data repositories or programs being contained on the second computer system by the plug-in. The updating may comprise, for example, adding, modifying and/or deleting data values of the electronic document comprising the data having been used for generating the message or may comprise updating another electronic document or data repository in dependence on the received transactional data.

For example, the transactional data may comprise information on whether an ordered good can be delivered within a particular period of time. That information may be extracted from the received transactional data by the plug-in and be automatically inserted into placeholders of an electronic document according to a mapping having been stored in the plug-in or in an electronic document.

As has been explained previously, the submitted message and the transactional data received in response to the submitted request for transactional data may be stored by the plug-in in one or more copies on the second computer system.

According to further embodiments, the plug-in stores the received transactional data in a data storage being operatively coupled to the second computer system. For example, the plug-in may store the received transactional data in the electronic document, e.g., an MS Excel internal Access database. Accordingly, the message and transactional data is stored, according to embodiments of the invention, in at least one copy by the first computer system and by the second computer system respectively.

The transactional data and/or the submitted message may be stored by the plug-in in a relational database, e.g., the relational database such as a "behind the scene" version of a MS Access being coupled to application programs such as MS Excel. According to embodiments, the plug-in stores a first version of the message and transactional data in a first model format and a first message format the operator of the first and the second application have agreed upon for communication. In addition, the plug-in stores a second copy of the transmitted messages and the corresponding transactional data in a second model format and second message format for audit purposes.

According to further embodiments the plug-in executes: storing the transactional data having been queried by the plug-in in a data storage being operatively connected to the second computer system. The data storage is, according to embodiments, implemented as a local replica of the data storage being operatively coupled to the first computer system. The replica data storage comprises the transactional data stored in association with the message having been submitted to the B2B server previously. The plug-in running on the second computer system controls the replication and updating of the local data storage, e.g., by submitting requests for transactional data on a regular basis. A plug-in according to the embodiments may not query the remote database but rather query the local data storage/replica in order to update electronic documents of the second application with transactional data having been generated on the server side.

According to embodiments, the specified model format and message formats allow the inspection of the data values having been transmitted from the plug-in to the first application. This is advantageous as it enables an operator of the second computer system to ensure that the plug-in having originally been provided by the operator of the first application only submits data values to the operator of the first application the plug-in is supposed to submit.

For example, if the configuration data of the plug-in comprises a model format identifier being indicative of the ARIBA model format, any ERM instance generated by the plug-in is transformed by the mapping engine into the ARIBA model format.

Depending on the embodiment, the model update request may be submitted from the plug-in upon starting the plug-in and/or the source application the plug-in is interoperable with or the model update request is submitted on a regular basis. The model update request is submitted from the plug-in to the first computer system via the B2B gateway of the B2B server. According to some embodiments, executing the source application being interoperable with the plug-in may be inhibited until the plug-in has submitted a model update request and has received either a new ERM version or a notification that no new ERM version is available.

In a further aspect, the invention relates to a computer readable medium having a computer program product stored thereon, which when executed by a processor, automatically operates the steps of the method of any one of the above embodiments of the invention.

In a further aspect, the invention relates to a client computer system for the integration of a first and a second application, the first application being an e-business service program being provided by a B2B server, the second application being an application program installed on the client computer system, the computer system comprising: a network interface; a plug-in interface; one or more processors; and a computer readable storage medium having a first computer program product specifying the second application stored thereupon, the medium further having a second computer program product specifying the plug-in stored thereon which when executed by the one or more processors, automatically operates the steps of the method of any one of the above embodiments of the invention executed by the plug-in running on the second computer system, wherein the plug-in interface and the network interface are used to exchange data between the first application and the plug-in via a network.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system (e.g., a computer system), apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer system, special purpose computer system, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to the invention methods and computer readable media as described in the appended independent claims are provided. Embodiments of the invention are described in the appended dependent claims. Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the figures.

DETAILED DESCRIPTION OF THE INVENTION

Embodiments of the invention are described herein after by way of examples with reference to the accompanying figures and drawings.

Figure 1:
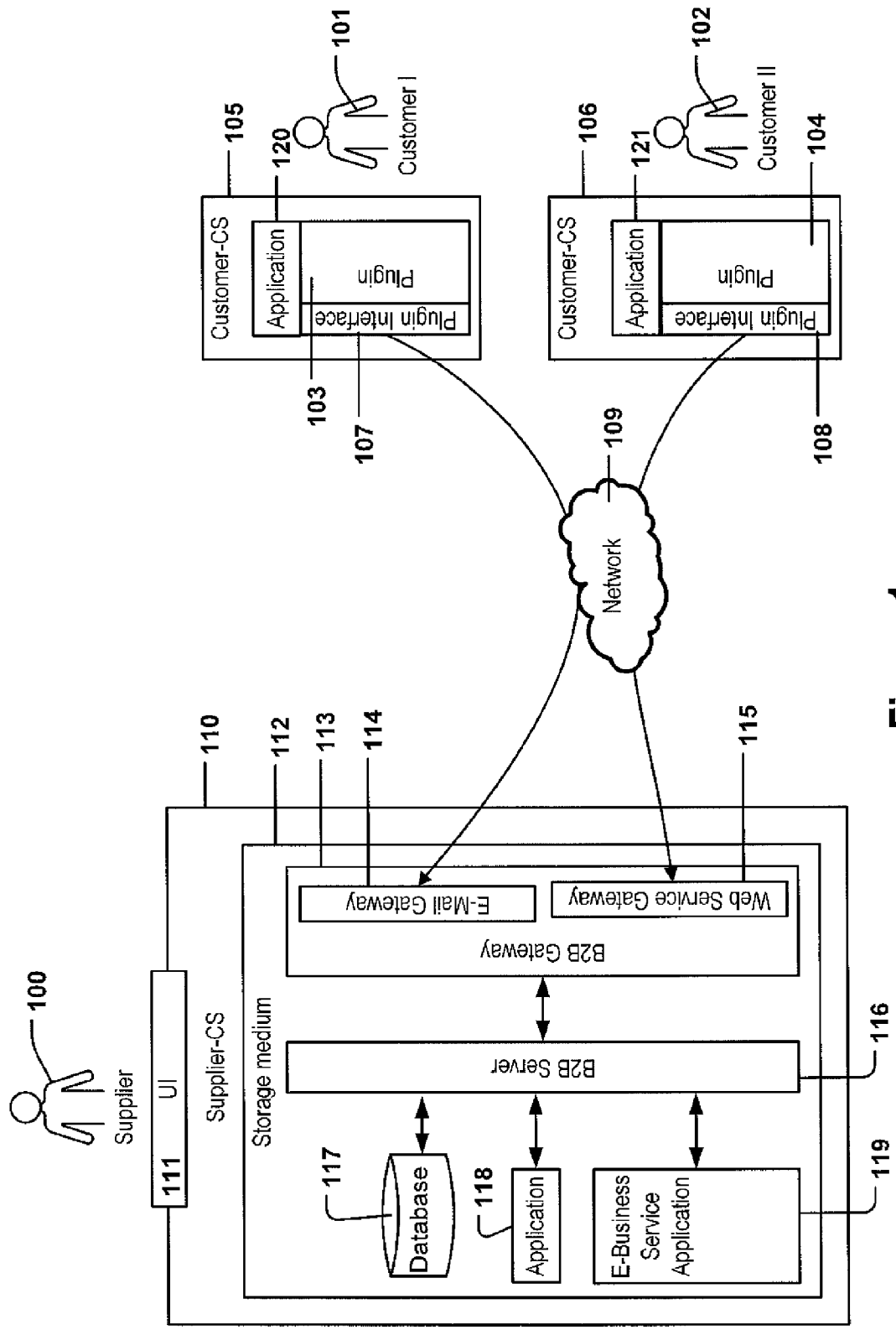
FIG. 1 depicts a distributed computer system comprising one server computer system and multiple client computer systems.

FIG. 1 depicts a server computer system 110 (supplier computer system) and two client computer systems (customer computer systems) 105 and 106 which are connected via network 109. The supplier computer system is operated by a supplier 100 and comprises a computer-readable storage medium 112, a B2B server 116 and a B2B gateway 113 providing access to the B2B server 116. The B2B gateway 113 of the depicted embodiment comprises an email gateway 114 and a web service gateway 115. The B2B server 116 provides access to one or more applications 118, databases 117, and/or e-business service applications 119.

Plug-in 103 is interoperable with application 120 which is, for instance, a Microsoft Excel spreadsheet application. The plug-in 103 communicates with the B2B gateway 113 via its plug-in interface 107. Depending on the embodiment, a plug-in 103 may comprise one or multiple different plug-in interfaces for communicating with one or multiple different B2B gateways 114 and 115. Plug-in 104 is interoperable with application 121 and comprises a plug-in interface 108, e.g., an interface for submitting and receiving email messages.

Figure 2:
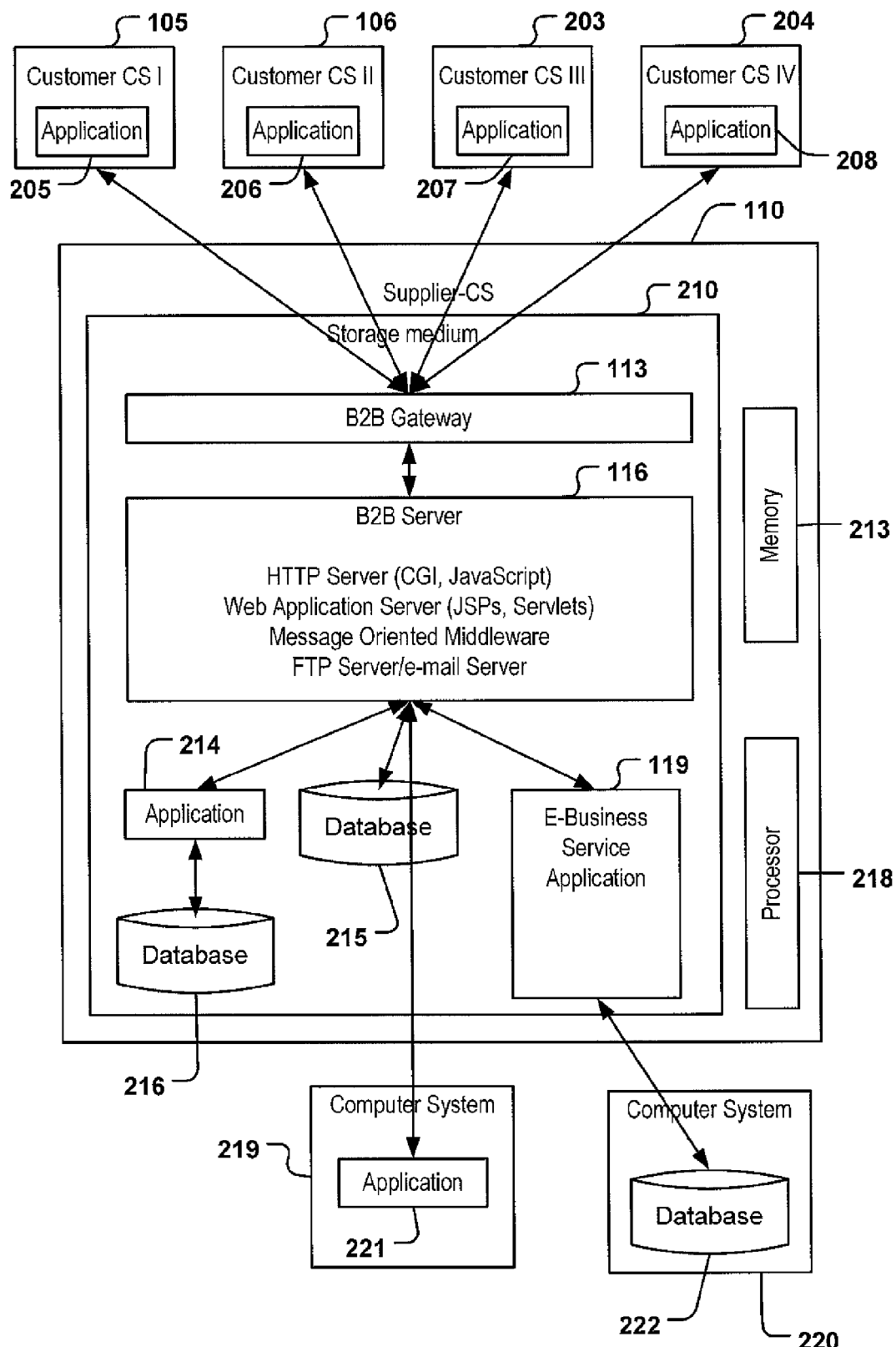
FIG. 2 depicts the server computer system in greater detail.

FIG. 2 depicts a supplier computer system 110 in greater detail. The B2B server 116 may be implemented as HTTP server, as application server, as message oriented middleware, and/or as a FTP server or email server. The B2B server 116 provides direct or indirect access to databases 215, 216, and 222, and provides access to backend applications 214, 221 and 119, which may be running on the supplier computer system 110 or on other computer systems 219, 220 being operatively coupled to the computer system 110 hosting the B2B server 116 and the B2B gateway 113. The supplier computer system comprises a memory 213 and a processor 218 for executing instructions stored on the storage medium 210. Multiple client computer systems 105, 106, 203 and 204 having installed source applications 205-208 may access the B2B server 116 via the B2B gateway.

Figure 3:
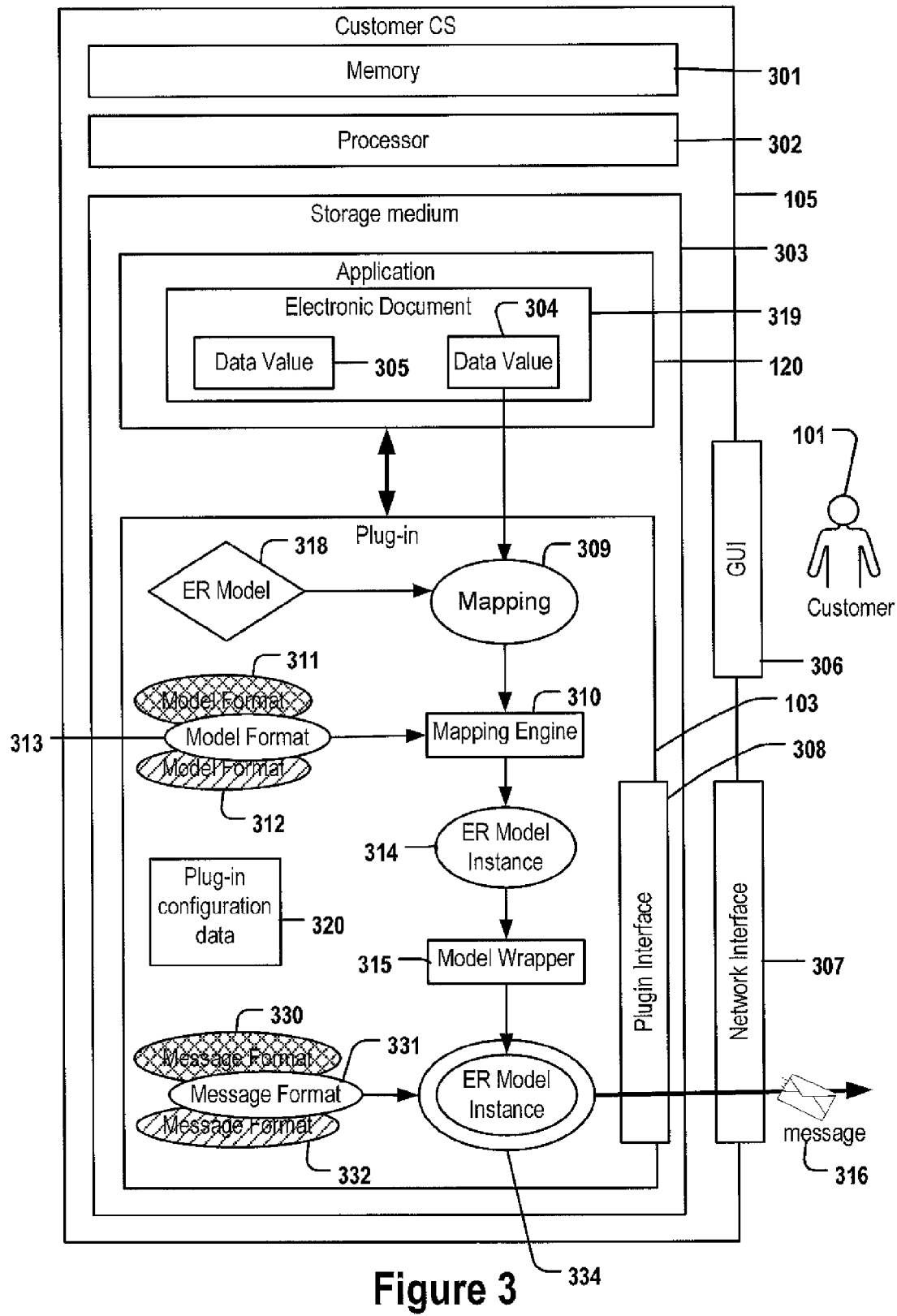
FIG. 3 depicts one of the client computer systems in greater detail.

FIG. 3 depicts a customer computer system 105 in greater detail. The customer computer system 105 comprises a memory 301, a processor 302, and a computer-readable storage medium 303. The computer-readable storage medium 303 comprises instructions for execution by the processor 302. A source application 120 (an application providing the data values to be mapped to the ERM 318 of the supplier) is installed on the storage medium 303 and can be used by customer 101 to create, retrieve, manage, and/or store data values 304 and 305. The data values 304, 305 can be stored and modified within an electronic document 319 such as an MS Excel spreadsheet document, a Microsoft Office Word document, and/or the like.

According to embodiments of the invention, the plug-in 103 comprises one or more integrated ER models 318, one or more mappings 309, a mapping engine 310, a model wrapper module 315, and one or more plug-in interfaces 308. Each plug-in interface 308 is operable to communicate with a B2B gateway 113, e.g., a web services gateway. The communication between the plug-in 103 and the B2B gateway is executed via network interface 307 which is, for example, an Ethernet card or any other physical network interface.

The ER model 318 can be, for example, an XML file stored to storage medium 303 as part of the plug-in 103. The mapping 309 is a piece of information specifying which placeholder of the electronic document 319 (e.g., which cell of a spreadsheet document) is mapped to which ERM element. Each of the mapped placeholders may comprise a data value.

Depending on the embodiment, the assignment may be executed by means of a graphical user interface comprising one or more GUI components. The GUI components are displayed to the user 101 for selection via graphical user interface 306, e.g., a dialog window being displayed on a computer screen. By selecting a particular GUI component provided by the plug-in 103 and by assigning the selected component to a placeholder, a user can create a mapping 309 which is stored within the plug-in 103 in storage medium 303. The mapping 309 is used as input by a mapping engine 310 to create a new instance 314 of the integrated ERM 318.

According to embodiments of the invention, the mapping engine 310 is a software module being executed as part of the plug-in 103. The mapping engine 310 is operable to create the new ERM instance 314 according to one out of a plurality of possible model formats 311, 312, and 313. The mapping engine 310 receives information of which kind of model format the e-business service application 119 requires, e.g., by reading plug-in configuration data 320, and creates an ER model instance 314 conforming to the required model format 313 based on the received mapping 309, the integrated ER model 318, and the identified model format 313.

According to embodiments, the model wrapper 315 receives the formatted ER model instance 314 from the mapping engine 310 and receives information indicative of one of message formats 330, 331 and 332. An identifier of the message format may also be stored in plug-in configuration data 320.

For example, message format 330 could correspond to an email message format, message format 331 could correspond to an XML document conforming to an XML schema definition required by a web service gateway, and message format 332 could correspond to an SMS message format. Depending on the embodiment of the invention, the information being indicative of the message format may be inbuilt in the plug-in 103, e.g., in the plug-in configuration data 320, or may be received dynamically from the B2B server 116. The formatted ER model instance 334, formatted according to the message format 330, is sent in the form of a message 316 via a network to the B2B Gateway.

Figure 4:
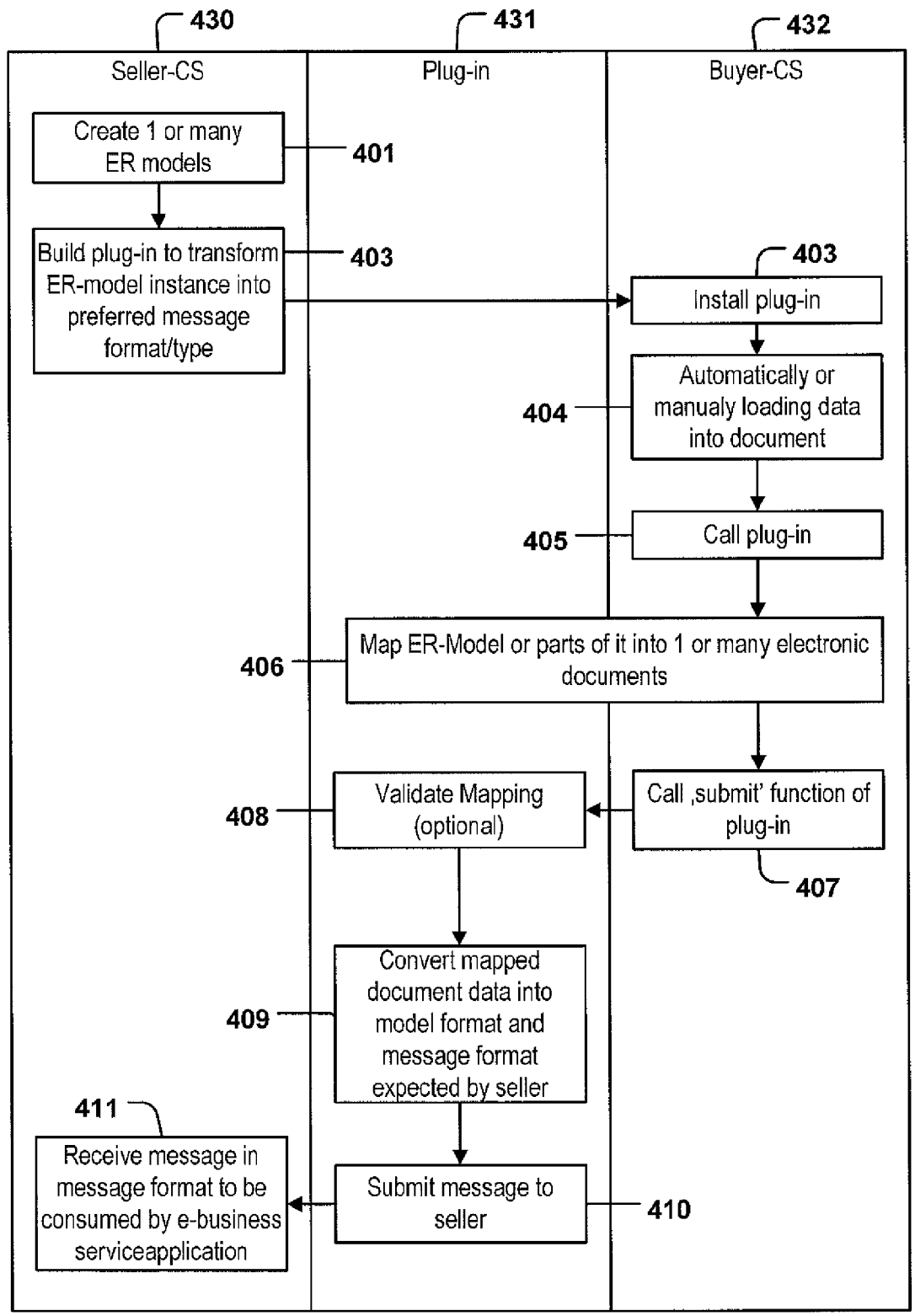
FIGS. 4, 5 and 6 show several steps to be executed by a seller computer system (seller-CS), a buyer computer system (buyer-CS) and a plug-in running on the buyer-CS.

FIG. 4 depicts a sequence of steps being executed on a seller-CS 430, on a plug-in 431, and on a buyer-CS 432 for integrating data of the buyer-CS 432 into the seller-CS 430. The plug-in 431 is installed on the buyer-CS 432. At first, one or more ERMs are created by the operator of the seller-CS 430 in step 401. The ERMs are created on the seller-CS 430 hosting the e-business service application to which the data structure defined in the ER model functionally belongs to. The operator of the seller-CS 430 may also create more than one ER model. The seller-CS 430 hosts the e-business service application, the B2B server and the B2B gateway on one seller-CS 430. A typical function of the ER model is to describe/model at least one aspect of a business model or a business workflow of the business owned by the operator of the seller-CS 430. In step 402, the plug-in 431 is created by the operator of the seller-CS 430 by programming the plug-in 431, e.g., based on Java, C++ or based on any other appropriate programming language. The ERM is integrated into the plug-in 431 and the plug-in 431 is then provided to the seller-CS 430, e.g., as a downloadable file or via a CD-ROM submitted from the seller to the buyer.

In step 403 the plug-in 431 is installed on the buyer-CS 432. In operation, the installed plug-in 431 is interoperable with the source program, e.g., Microsoft Excel, which is also installed on the buyer-CS 432. In step 404, one or more data values are loaded, entered, or otherwise inserted into an electronic document of the source application manually. The data values may also have been contained in the electronic document when the document was loaded.

The user calls the plug-in 431 which may automatically display the mapping window 800 (FIG. 8) for executing the mapping. The plug-in may likewise display the mapping dialog window upon the receipt of a user command to start the mapping process. In step 406, the ER model or parts of the model are read and each element is displayed to the user in form of a GUI component via a GUI. The user assigns at least some placeholders of the document to GUI elements in step 406 and thereby creates a mapping. The mapping is used by the mapping engine to automatically create a new ERM instance. In the optional step 408, various checks are executed by the plug-in 431 to evaluate the correctness of the mapping and the mapped data values. In case no or no major errors are detected, the new model instance is transformed by the mapping engine in a particular model format which can be processed by the seller-CS 430, and is wrapped in a message conforming to a message format being interpretable by the seller-CS 430 in step 409. The user may press a submit-button provided by the plug-in 431 and trigger the submission of a message comprising the new ERM instance by the plug-in 431 to the seller-CS 430 in step 410. The message is received in step 411 by the seller-CS 430 in the model/message format to be consumed by the backend application, which is an e-business service application.

According to the depicted embodiment, the message may comprise an ER model instance comprising ordering information. The ordering information may comprise one or more goods ordered by the user of the buyer-CS 432, the ordered goods having been mapped in step 406 to the ERM of an e-business service application running on the seller-CS 430. The e-business service application having received the message processes the data values of the buyer having been mapped to the ERM of the seller and generates transactional data as a result. The transactional data can be, for example, information on the processing status of the ordered good, i.e., if the good has already been delivered, fetched from the warehouse or has any other status information assigned. The received message and corresponding transactional data is stored by the seller-CS 430. The transmitted data values contained in the ERM instance of the message can be processed by the seller-CS 430, thereby integrating the received data values of the buyer-CS 432.

Figure 5:
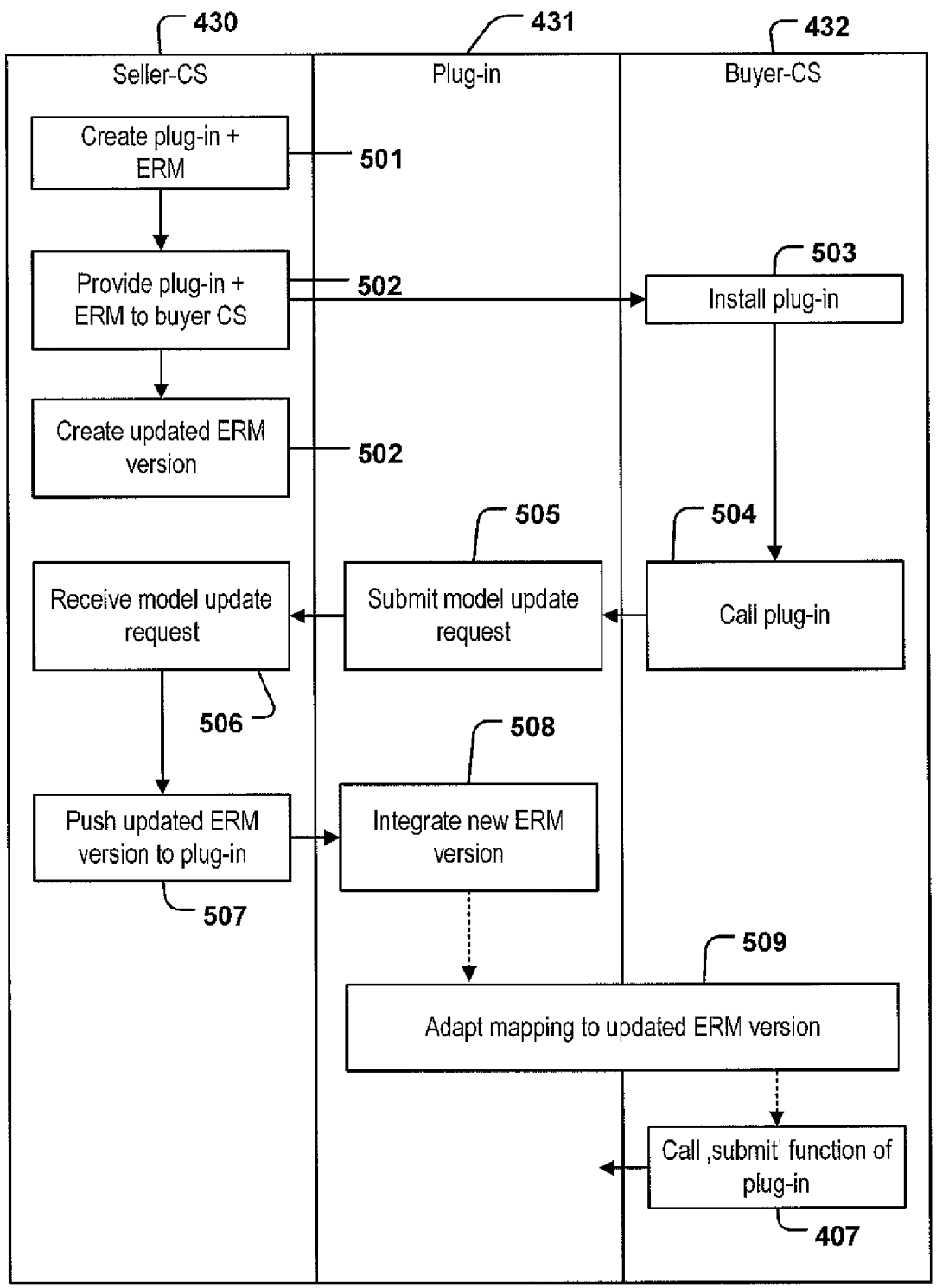

FIG. 5 depicts a sequence of steps for updating the ER model of a seller-CS 430 and providing the updated version of the ERM to one out of a plurality of plug-ins 431 having been already installed on a multitude of buyer-CSs. When the plug-in 431 is created in step 501, an ERM of the e-business service application running on the seller-CS 430 is integrated to the plug-in 431 and the plug-in 431 including that ERM is provided in step 502 to the buyer-CS 432. When the plug-in 431 and/or the source application is started in step 504, the plug-in 431 submits a model update request in step 505 to the first application running on the seller-CS 430. In case a newer (an updated) version of the ERM exists on the seller-CS 430, the newer version needs to be pushed to all buyer-CSs 432 in order to keep the integrated data consistent between the seller-CS 430 and the buyer-CSs 432. As a new version of the ERM was provided in step 502, an update of the ERMs integrated in the already distributed plug-ins 431 is necessary.

Upon receipt of a model update request in step 506 by the seller-CS 430, the seller-CS 431 pushes in step 507 the new version of the ERM to the plug-in 431 having submitted the model update request. In step 508, the plug-in 431 receives the updated ERM version and uses the version to replace the outdated integrated ERM version. In step 509 the plug-in 431 may be used by the user to adapt existing mappings to the updated ERM version. In step 407, a message comprising the data values having been re-mapped to the new ERM may be submitted to the seller-CS 430.

Figure 6:
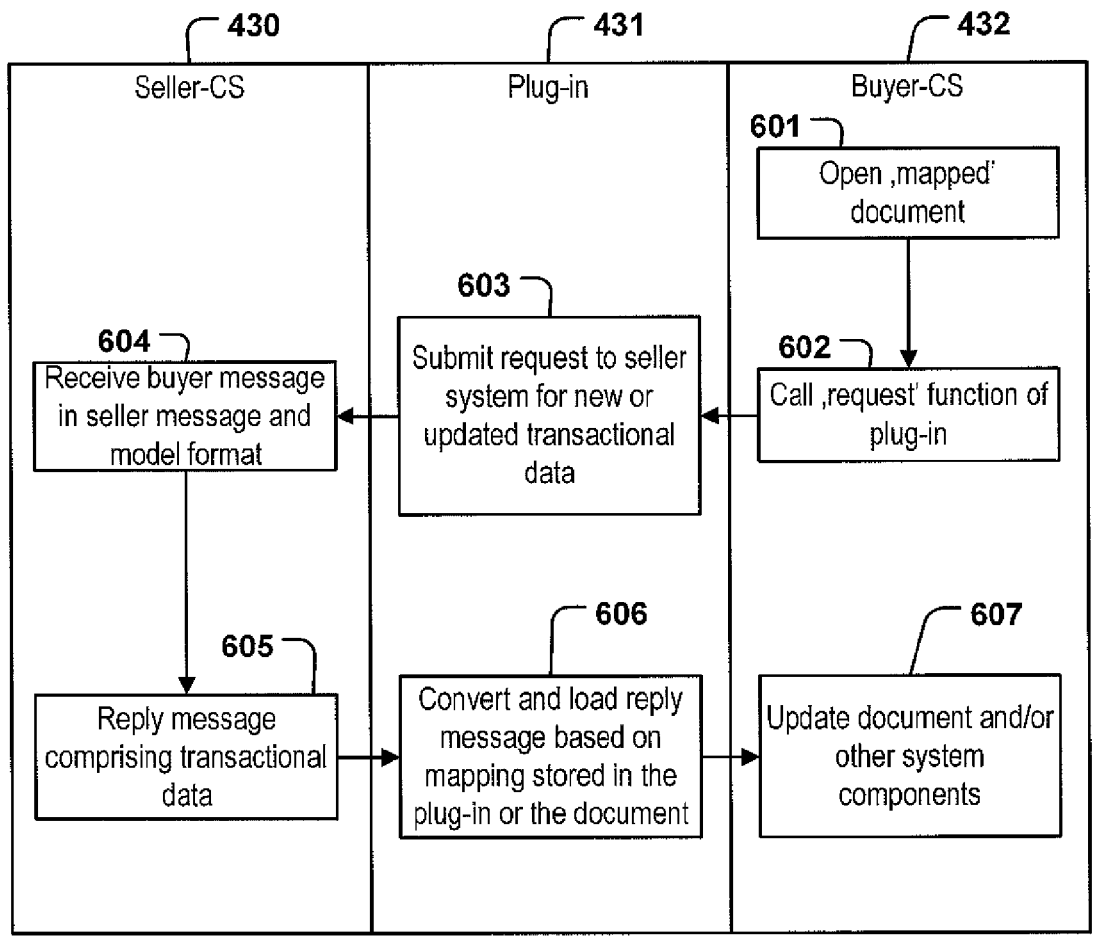

FIG. 6 depicts a set of steps being executed on the seller-CS 430, on a plug-in 431, and on a buyer-CS 432 for receiving transactional data and updating electronic documents.

In step 601, an electronic document comprising one or more mappings is opened by a user of the buyer-CS 432. An electronic document comprising one or more mappings is an electronic document having stored information being indicative of which placeholder and corresponding data value within the electronic document was mapped to an element of an ERM integrated into the plug-in 431.

In step 602, the plug-in 431 is called, e.g., by the user of the buyer-CS 432 pressing a button displayed in a menu bar of the source application being presented by the plug-in 431. The called plug-in 431 submits a request to the seller-CS 430 in step 603 to retrieve new or updated transactional data corresponding to the message having been submitted previously in step 410 or having been created by the seller-CS 430 for any other reason.

In step 604, the request is received by the e-business application via the B2B Gateway and the B2B server of the seller-CS 430 from the buyer-CS 432. The request comprises an identifier being indicative of the buyer or of the message having been sent to the seller-CS 430 previously in step 410. The identifier is used to identify transactional data having been stored in association with the message. The transactional data may be stored, e.g., in a database being operatively coupled to the seller-CS 430. According to other embodiments, the identifier is not submitted as part of the request but in an authentication step wherein the buyer-CS 432 authenticates itself or the buyer at the seller-CS 430.

The seller-CS 430, after having gathered the transactional data having been stored in association with the message and/or after having processed the request generates a response in the form of a reply message which is sent in step 605 to the plug-in 431.

According to some embodiments, the response message comprises an ER model instance conforming to an ER model format which is processable and interpretable by the e-business service application and the plug-in 431. The ERM instance being contained in the response message is generated by the e-business service application and comprises transactional data. Depending on the embodiment, the response message may be created by the e-business service application and transferred to the buyer-CS 432 by the B2B server hosting the e-business service application via the B2B gateway. According to other embodiments, the B2B server or another software module hosted by the B2B server receives the ER-model comprising data values corresponding to transactional information and uses the ER-model to generate a response message.

According to other embodiments, the response message does not comprise an ER model instance but rather delivers the transactional data in any other format that can be processed and interpreted by the plug-in 431.

Upon having received the response message, the plug-in 431 loads in step 606 one or more data values being contained in the reply message to placeholders of an electronic document. The mapping is executed based on mapping information having been stored previously in the plug-in 431 or in the electronic document. A user may have mapped an ERM element to empty placeholders with the intention that the plug-in 431 will automatically fill the placeholder with data when it receives transactional data comprising an ERM instance from the seller-CS 430. As a result of step 606, the data values having been received by the plug-in 431 in the response message are automatically integrated in the electronic document, thereby automatically updating the electronic document with transactional data.

The electronic document comprising a list of ordered goods may be automatically updated by the steps described above and comprise, as a result, transactional data being indicative of the current processing/shipment status of the ordered goods.

Depending on the embodiment, updating the electronic document may comprise the steps of adding the received transactional data values by the plug-in into placeholders (e.g., cells) of the electronic document. Thereby, empty placeholders may have assigned new data values and old data values may be overwritten and modified. Updating may also comprise deleting existing data values from the electronic document. According to further embodiments, scripts or programs being automatically executed on the buyer-CS 432 may use the automatically updated electronic document(s) to automatically update further data repositories and process workflows of the buyer-CS 432.

Figure 7:
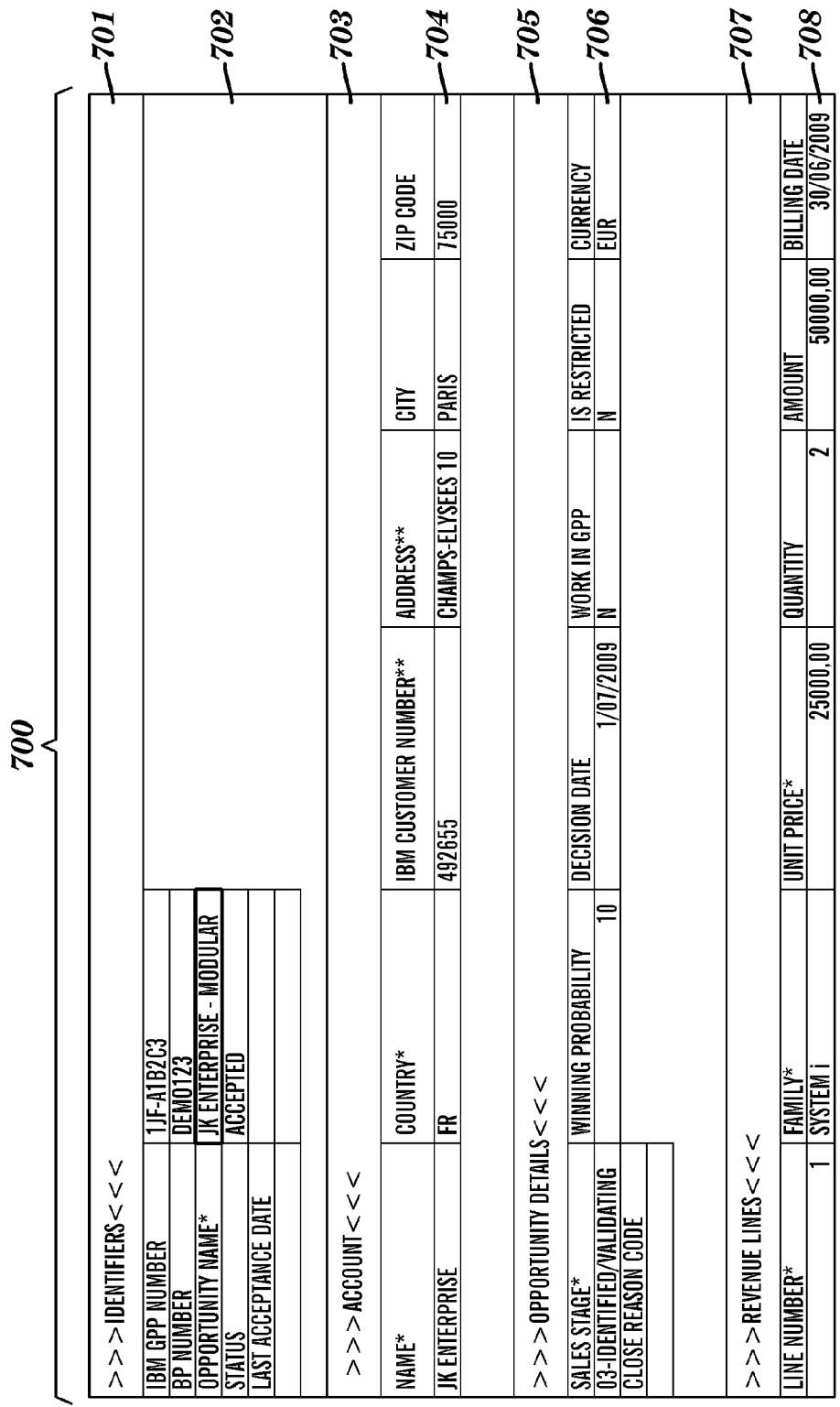
FIG. 7 is a screenshot of an electronic document comprising data values to be integrated.

FIG. 7 depicts a screenshot 700 of a spreadsheet document. The spreadsheet document, e.g., an MS Excel document, comprises multiple data values such as 'opportunity name', 'opportunity status', 'last acceptance date' or account details such as 'account name', 'country', 'customer number', 'address', and the like. The spreadsheet document is designed and organized according to the needs of a human user. It comprises highlighted headlines 701, 703, 705, and 707 being indicative of 'identifiers', 'account', 'opportunity details' and 'revenue lines'. Several other cells comprise data values of various kinds. Cell 704, for example, comprises an integer value being indicative of the zip code. Cell 706 comprises a three character string being indicative of a currency. Cell 708 comprises a date value. At the left side of the screenshot 700, in the first column, the names of the parameters and data values being contained in cells in the second column are indicated. A human user can easily comprehend this structure of the data values contained in the Excel spreadsheet, because that structure is graphically indicated by means of headlines and cells comprising parameter names (first column). However, this kind of data format can usually not be used for automatic data integration as is, because formatting information as depicted in the screenshot 700 cannot be easily processed by program routines and used to determine the semantic data structure of the data stored to the depicted spreadsheet.

By using an MS Excel plug-in according to embodiments of the invention, a user can easily transform the data structure which is obvious to him to an ERM which can be processed by the seller-CS.

Figure 8:
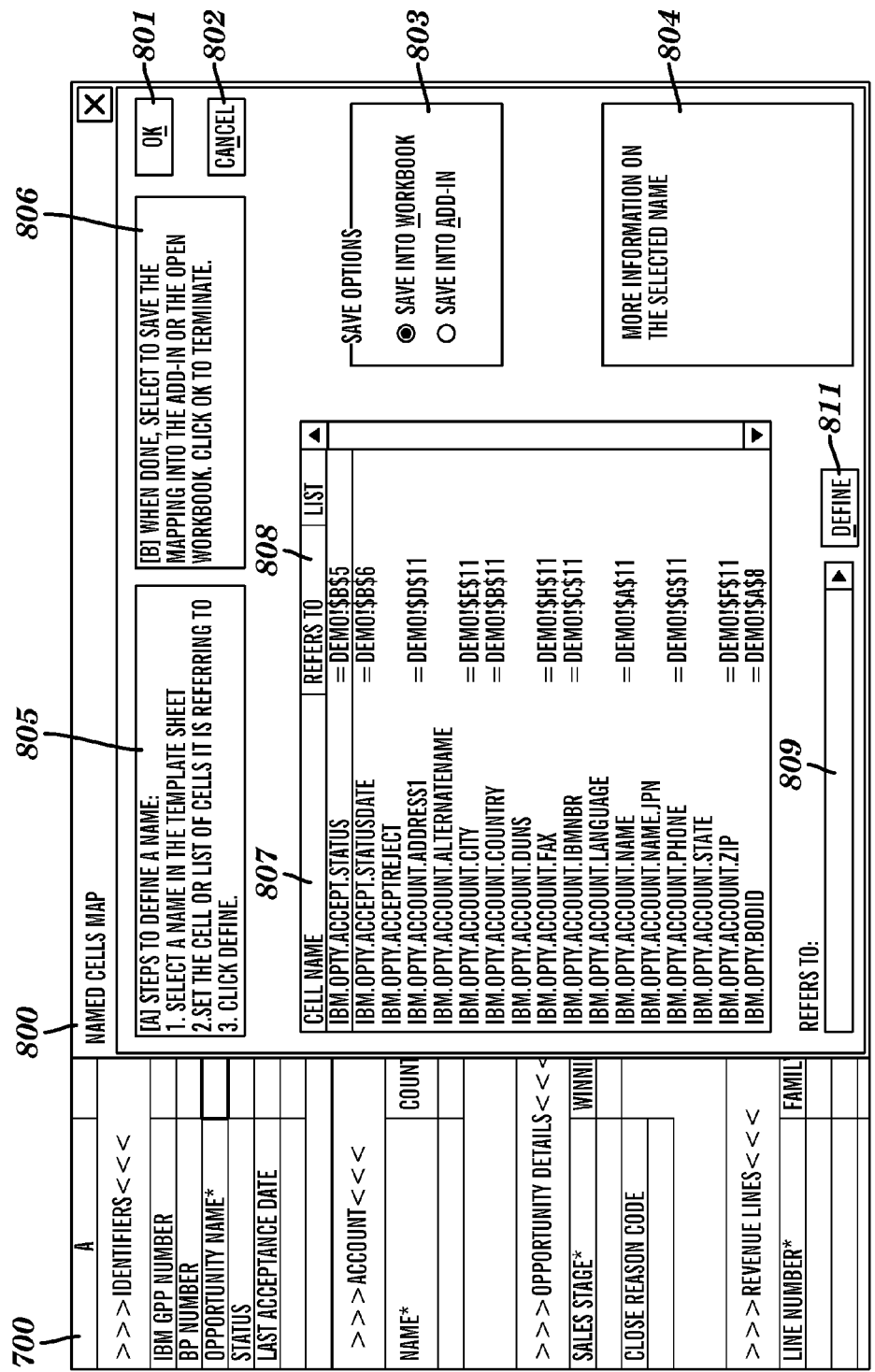
FIG. 8 and FIG. 9 are screenshots of a dialog window for mapping data values to ERM elements.

FIG. 8 depicts the screenshot 700 of the spreadsheet after the user has started the mapping function of the plug-in. The mapping dialog window 800 is displayed to the user. The window comprises an OK button 801, a Cancel button 802, and a field set 803 for specifying safe options (if the generated mapping information is to be stored within the workbook/document or in the plug-in). The dialogue window 800 further comprises additional information panes 804, 805, and 806. Information panes 805 and 806 are indicators of the steps which have to be done by a user in order to map data contained in the spreadsheet document to elements of the ERM. The dialogue window 800 further comprises a scroll pane which comprises three columns. The left column 807 of the scroll pane comprises a list of element names of the ER model. The elements of that list displayed in the first column are GUI components which have been generated by the plug-in and which represent elements of the ER model integrated within the plug-in. GUI components displayed in that list are, for example: IBM.cXML.SHIP.ORDERID or IBM.cXML-.SHIP.CARRIER.UIC.

Information pane 804 displays, upon selection of a particular graphic user interface component in the left column, additional information on the nature and/or function of the ERM element represented by the selected component. This may help the user to determine, whether the selected component really represents that very ERM element he wants to select. The indicated information can be comprehended also by users not being skilled in the programming art and who cannot read and interpret XML schema documents and or XML element attributes.

According to some embodiments, the mapping connects repeating placeholders of the electronic document, e.g., every second cell of the third column of a spreadsheet document, to a particular ER model element or to a series of ER model elements. The dialog window 800 of some of the embodiments comprises GUI elements for selecting or specifying the repeating placeholders.

The dialog window 800 further comprises panes or other GUI elements being indicative of whether the assignment of a data value to a selected ERM element is mandatory or not in order to specify a first ER model instance.

The user can add a new mapping by selecting an unmapped GUI component in the left column in a first step. In the next step, the user may select via GUI element 809 one or more additional cells contained in the spreadsheet. The user may also select cells which have already been assigned to an element of the or another ERM. After the user has selected one or more cells he wants to map, the user may press the define button 811. As a result, a new assignment of one or more spreadsheet cells to ERM elements is added to the mapping. The term 'mapping' as used herein encompasses a data structure comprising a set of placeholders of an electronic document having been mapped to an ERM element.

The user may close the dialog window 800 and open it again to add one or more additional mappings. The user may specify a plurality of different mappings for one particular ERM integrated to the plug-in. The data values of the spreadsheet documents having been assigned to ERM elements according to the plurality of different mappings may overlap. As the plug-in may have integrated a multitude of different ERMs and as each such ERM may corresponds to a plurality of mappings, the user may have specified and stored within the plug-in or within one or more different electronic documents a plurality of mappings for a plurality of different purposes.

Figure 9:
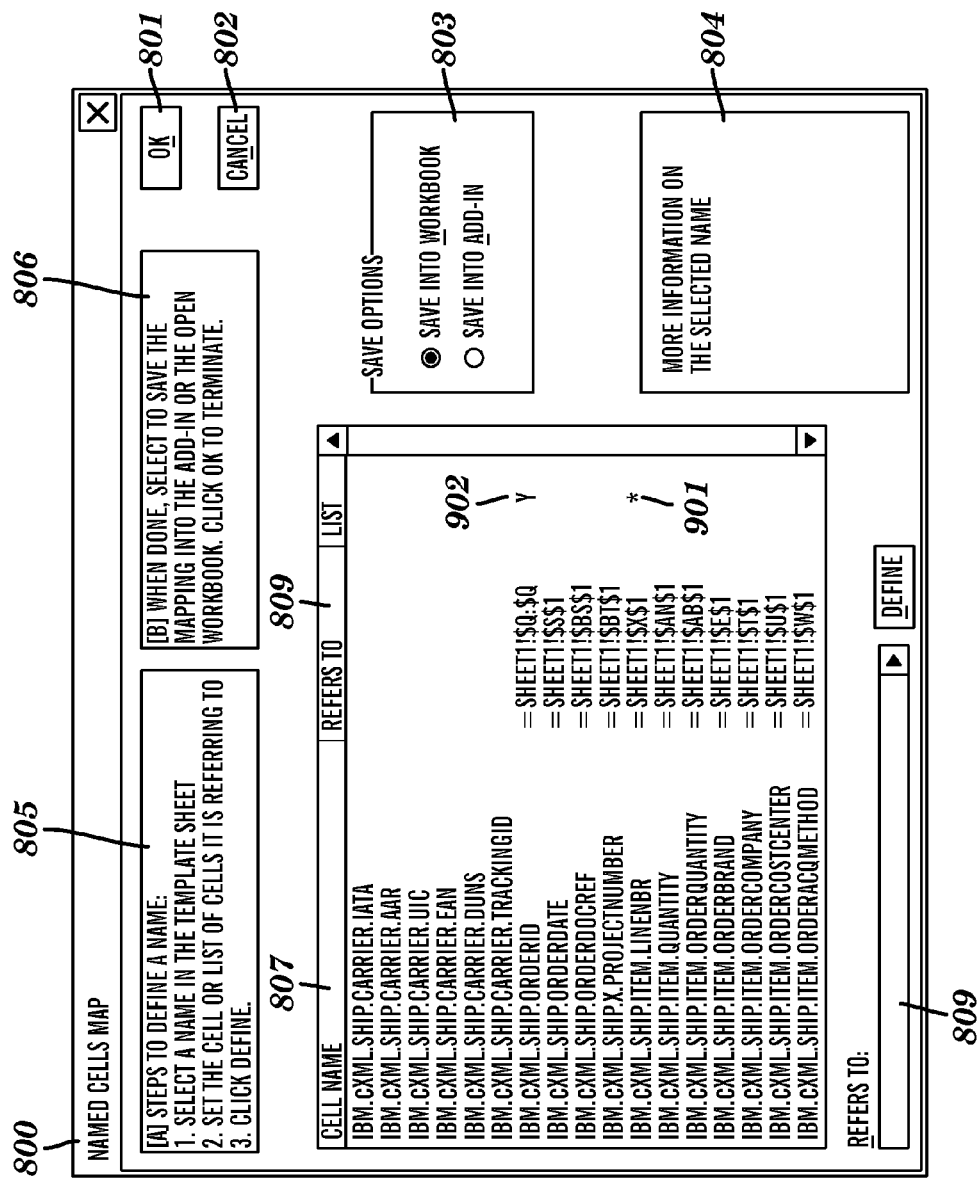

FIG. 9 depicts a screenshot of the dialog window 800 comprising in addition two GUI components 'Y' 902 and '*' 901 for indicating additional mapping information to the user. According to the depicted embodiment, the '*' symbol indicates that the assignment of a placeholder comprising a data value is necessary for a particular ERM element while the 'Y' symbol indicates a 1:n mapping of 1 ERM element to n data values, n being an integer larger or equal to 0.

The present invention thus provides a computer implemented method or system and can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The invention claimed is:

1. A computer-implemented method for integration of a first application and a second application, the first application comprising an e-business service application and being provided by a business-to-business (B2B) server, the B2B server being accessible via one or more B2B gateways, the first application running on a first computer system, the second application running on a second computer system, the method comprising:
   integrating an Entity-Relationship model of the first application in a plug-in of the second application, the plug-in of the second application communicating with the one or more B2B gateways, the plug-in comprising one or more integrated Entity-Relationship models, one or more mappings, a mapping engine, and one or more plug-in interfaces for communicating with the one or more B2B gateways;
   displaying, by the plug-in, graphical user interface components representing elements of the integrated Entity-Relationship model to a user of the second application;
   wherein the graphical user interface components:
      enable specification of a mapping provided via the mapping engine of the plug-in of one or more placeholders of an electronic document of the second application to one or more elements of the Entity-Relationship model, whereby each placeholder is a container for one or more data values, and
      enable flexible adapting of the specified mapping to an updated version of the Entity-Relationship model or to changes in an arrangement of the data values within the electronic document; and
   submitting a message, by the plug-in, to the B2B server via one of the one or more B2B Gateways, the message comprising the one or more mapped data values and information regarding which element of the Entity-Relationship model the one or more data values were mapped to.

2. The computer-implemented method of claim 1, wherein the mapping is specified by a user by assigning the graphical user interface components to one or more placeholders being contained in the electronic document.

3. The computer-implemented method of claim 1, further comprising:
   receiving the message by a receiver instance, the receiver instance being the B2B server or the first application, and storing the received message to a data storage by the receiver instance;
   executing one or more program routines using data of the received message as input, to provide transactional data;
   storing the transactional data in association with the message;
   receiving a request for the transactional data, the request being submitted by the plug-in and being received by the receiver instance;
   sending, in response to the receipt of the request, the requested transactional data from the receiver instance to the plug-in; and
   upon receipt of the requested transactional data by the plug-in, automatically updating the electronic document by the plug-in.

4. A computer-implemented method for integration of a first application and a second application, the first application comprising an e-business service application and being provided by a business-to-business (B2B) server, the B2B server being accessible via one or more B2B gateways, the first application running on a first computer system, the second application running on a second computer system, the method comprising:
   providing an Entity-Relationship model for integration into a plug-in of the second application, the Entity-Relationship model being provided by the first application, the plug-in of the second application communicating with the one or more B2B gateways, the plug-in comprising one or more integrated Entity-Relationship models, one or more mappings, a mapping engine, and one or more plug-in interfaces for communicating with the one or more B2B gateways;
   receiving a model update request from the plug-in;
   submitting an updated Entity Relationship model version from the first application to the plug-in in response to the receipt of the model update request; and
   receiving a message comprising an Entity-Relationship model instance from the plug-in by the first application, the received Entity-Relationship model instance comprising one or more data values mapped via the mapping engine of the plug-in to elements of the updated Entity-Relationship model version.

5. The computer-implemented method of claim 4, further comprising:
   providing a model format specification for integration into the plug-in, the model format specification indicating a model format, the model format being interpretable by the first application, wherein the Entity-Relationship model and the model format specification are provided by the B2B server or the first application;
   wherein the received Entity-Relationship model instance is formatted according to the model format specification integrated into the plug-in.

6. The computer-implemented method of claim 4, wherein integrating the Entity-Relationship model into the plug-in comprises:
   integrating the Entity-Relationship model in the plug-in and transferring the plug-in after the integration to the second computer system, the second computer system having installed the second application, or by
   transferring the plug-in to the second computer system, the second computer system having installed the second application, transferring the Entity-Relationship model from the first application to the plug-in at the second computer system, and integrating the Entity-Relationship model in the plug-in at the second computer system.

7. The computer-implemented method of claim 4, further comprising:
   storing the received message by a receiver instance, the receiver instance being the first application or the B2B server, to a data storage coupled to the first computer system;

storing transactional data in association with the message, wherein the transactional data comprises one of: data generated by the receiver instance in response to the receipt of the message, or data generated previously by the receiver instance and identified as requested data by analyzing the received message;

receiving a request submitted by the plug-in for the transactional data, the request being received by the first application; and sending, in response to the receipt of the request, the requested transactional data to the plug-in.

8. A computer program product stored on a computer readable hardware device, which when executed, performs a method for integration of a first application and a second application, the first application comprising an e-business service application and being provided by a business- to-business (B2B) server, the B2B server being accessible via one or more B2B gateways, the first application running on a first computer system, the second application running on a second computer system, the method comprising:

providing an Entity-Relationship model for integration into a plug-in of the second application, the Entity-Relationship model being provided by the first application, the plug-in of the second application communicating with the one or more B2B gateways, the plug-in comprising one or more integrated Entity-Relationship models, one or more mappings, a mapping engine, and one or more plug-in interfaces for communicating with the one or more B2B gateways;

receiving a model update request from the plug-in;

submitting an updated Entity Relationship model version from the first application to the plug-in in response to the receipt of the model update request; and receiving a message comprising an Entity-Relationship model instance from the plug-in by the first application, the received Entity-Relationship model instance comprising one or more data values mapped via the mapping engine of the plug-in to elements of the updated Entity-Relationship model version.

9. A computer-implemented method for the integration of a first application and a second application, the first application comprising an e-business service application and being provided by a business-to-business (B2B) server, the B2B server being accessible via one or more B2B gateways, the first application running on a first computer system, the second application running on a second computer system, the method comprising:

displaying, by a plug-in, graphical user interface components representing elements of an Entity-Relationship model to a user of the second application, the Entity-Relationship model comprising an Entity-Relationship model of the first application, the plug-in being interoperable with the second application, the plug-in communicating with the one or more B2B gateways, the plug-in comprising one or more integrated Entity-Relationship models, one or more mappings, a mapping engine, and one or more plug-in interfaces for communicating with the one or more B2B gateways, wherein the graphical user interface components:

enable specification of a mapping provided via the mapping engine of the plug-in of one or more placeholders of an electronic document of the second application to one or more elements of the Entity-Relationship model, wherein each placeholder is a container for one or more data values; and enable flexible adapting of the specified mapping to an updated version of the Entity-Relationship model or to changes of an arrangement of the data values within the electronic document; and submitting a message, by the plug-in, to the B2B server via one of the B2B Gateways, the message comprising the one or more mapped data values and information regarding which element of the Entity-Relationship model the one or more data values were mapped to.

10. The computer-implemented method of claim 9, wherein the plug-in executes model instance integrity checks, the checks comprising at least one of data type correctness checks, data consistency checks, and remote checks.

11. The computer-implemented method of claim 9, wherein n messages are created by the plug-in, n being an integer larger than 0, the method further comprising:

storing, for each n, a mapping by the plug-in, each mapping specifying one or more placeholders of the electronic document and elements of the Entity-Relationship model to which the placeholders were mapped, wherein each placeholder is a container for one or more data values;

for each of the n stored mappings, automatically executing a parsing step, each parsing step specifying a message by determining one or more placeholders and data values contained therein having been mapped to one or more elements of the Entity-Relationship model according to the stored mapping, the parsing being executed by the plug-in; and submitting, for each of the n stored mappings, a message from the plug-in to the first computer system, each message comprising the at least one mapped data value and information to which element of the Entity-Relationship model the data value was mapped to according to the stored mapping.

12. The computer-implemented method of claim 9, wherein the plug-in is operable to transform an Entity-Relationship model instance into one or more different model formats, the method further comprising:

reading, by the plug-in, one predefined model format identifier from plug-in configuration data;

providing the read model format identifier to a mapping engine of the plug-in, the mapping engine being operable to transform the Entity-Relationship model instance into one or more different model formats; and transforming the Entity-Relationship model instance into a model format identified by the provided model format identifier, the model format being interpretable by the first application.

13. The computer-implemented method of claim 9, the method further comprising:

submitting a request for transactional data stored in association with the message, the request being submitted by the plug-in to the first application or the B2B server;

receiving, by the plug-in, the requested transactional data from the first application; and upon receipt of the requested transactional data by the plug-in, automatically updating, by the plug-in, the first electronic document, wherein the updating comprises adding, modifying, or deleting data values of the first electronic document in dependence on the received transactional data.

14. The computer-implemented method of claim 13, wherein the plug-in stores the received transactional data in the electronic document, and wherein a copy of the submitted message is stored in the electronic document.

15. A computer program product stored on a computer readable hardware device, which when executed, performs a method for integration of a first application and a second application, the first application comprising an e-business service application and being provided by a business-to-business (B2B) server, the B2B server being accessible via one or more B2B gateways, the first application running on a first computer system, the second application running on a second computer system, the method comprising:

displaying, by a plug-in, graphical user interface components representing elements of an Entity-Relationship model to a user of the second application, the Entity-Relationship model comprising an Entity-Relationship model of the first application, the plug-in being interoperable with the second application, the plug-in communicating with the one or more B2B gateways, the plug-in comprising one or more integrated entity relationship models, one or more mappings, a mapping engine, and one or more plug-in interfaces for communicating with the one or more B2B gateways, wherein the graphical user interface components:

enable specification of a mapping provided via the mapping engine of the plug-in of one or more placeholders of an electronic document of the second application to one or more elements of the Entity-Relationship model, wherein each placeholder is a container for one or more data values; and enable flexible adapting of the specified mapping to an updated version of the Entity-Relationship model or to changes of an arrangement of the data values within the electronic document; and submitting a message, by the plug-in, to the B2B server via one of the B2B Gateways, the message comprising the one or more mapped data values and information regarding which element of the Entity-Relationship model the one or more data values were mapped to.

\* \* \* \* \*